(12) United States Patent
Oota et al.

(10) Patent No.: US 9,374,170 B2
(45) Date of Patent: Jun. 21, 2016

(54) OPTICAL RECEIVING DEVICE

(71) Applicant: FUJITSU LIMITED, Kawasaki-shi, Kanagawa (JP)

(72) Inventors: Masato Oota, Atsugi (JP); Tomoki Katou, Kawasaki (JP); Kazuhiko Hatae, Kawasaki (JP); Hisao Nakashima, Kawasaki (JP); Manabu Yamazaki, Fuchu (JP)

(73) Assignee: FUJITSU LIMITED, Kawasaki (JP)

( * ) Notice: Subject to any disclaimer, the term of this patent is extended or adjusted under 35 U.S.C. 154(b) by 20 days.

(21) Appl. No.: 14/560,495

(22) Filed: Dec. 4, 2014

(65) Prior Publication Data

US 2015/0180586 A1    Jun. 25, 2015

(30) Foreign Application Priority Data

Dec. 24, 2013   (JP) ................. 2013-265429

(51) Int. Cl.
| | |
|---|---|
| H04B 10/61 | (2013.01) |
| H04L 25/03 | (2006.01) |
| H04B 10/079 | (2013.01) |
| H04L 25/02 | (2006.01) |

(52) U.S. Cl.
CPC ........ *H04B 10/616* (2013.01); *H04B 10/07953* (2013.01); *H04B 10/6162* (2013.01); *H04L 25/0224* (2013.01); *H04L 25/03019* (2013.01); *H04L 25/03114* (2013.01); *H04L 25/03133* (2013.01); *H04L 25/03292* (2013.01)

(58) Field of Classification Search
CPC ............ H04B 10/60–10/6973; H04L 25/03–25/03292
USPC ............ 398/202–214; 375/229–236
See application file for complete search history.

(56) References Cited

U.S. PATENT DOCUMENTS

| | | | | |
|---|---|---|---|---|
| 2005/0063275 | A1* | 3/2005 | Yamamoto | G11B 5/035 369/59.22 |
| 2009/0208224 | A1* | 8/2009 | Kikuchi | H04B 10/672 398/141 |
| 2012/0134684 | A1* | 5/2012 | Koizumi | H04B 10/613 398/202 |

FOREIGN PATENT DOCUMENTS

JP    2012-119923    6/2012

* cited by examiner

Primary Examiner — Li Liu
(74) Attorney, Agent, or Firm — Staas & Halsey LLP

(57) ABSTRACT

An optical receiving device includes: an adaptive equalizer that includes a position estimation unit configured to estimate, based on a first signal component and a second signal component of a reception signal generated by reception of a training sequence pattern transmitted from an optical transmitter, a symbol position of the reception signal, and generates an estimated symbol position, a delay unit configured to provide a delay difference between the first signal component and the second signal component, a control unit configured to set a plurality of symbol displacement amount candidates of displacement amounts for the estimated symbol position, causes the delay unit to generate a plurality of delay differences, and generates a channel estimation symbol position used for channel estimation, and an error rate calculation unit configured to calculate an error rate of the signal restored by an adaptive equalization unit.

8 Claims, 30 Drawing Sheets

| | DELAY DIFFERENCE | | | | |
|---|---|---|---|---|---|
| | | -2 | -1 | 0 | +1 | +2 |
| SYMBOL DISPLACEMENT AMOUNT CANDIDATE | -3 | 1% | 1.1% | 1.5% | 3% | 10% |
| | -2 | 1% | 1% | 1.1% | 1.5% | 3% |
| | -1 | 1% | 1% | 1% | 1.1% | 1.5% |
| | 0 | 1% | 1% | 1.1% | 1.5% | 3% |
| | +1 | 1% | 1.1% | 1.5% | 3% | 10% |
| | +2 | 1.1% | 1.5% | 3% | 10% | 15% |
| | +3 | 1.5% | 3% | 10% | 15% | 20% |

| | | MAXIMUM DELAY DIFFERENCE WHERE ERROR RATE FALLS WITHIN REFERENCE VALUE | | |
|---|---|---|---|---|
| | | -DIRECTION | +DIRECTION | SMALLER ONE |
| SYMBOL DISPLACEMENT AMOUNT CANDIDATE | -3 | 2 | × | × |
| | -2 | 2 | 0 | 0 |
| | -1 | 2 | 1 | 1 |
| | 0 | 2 | 0 | 0 |
| | +1 | 2 | × | × |
| | +2 | 2 | × | × |
| | +3 | × | × | × |

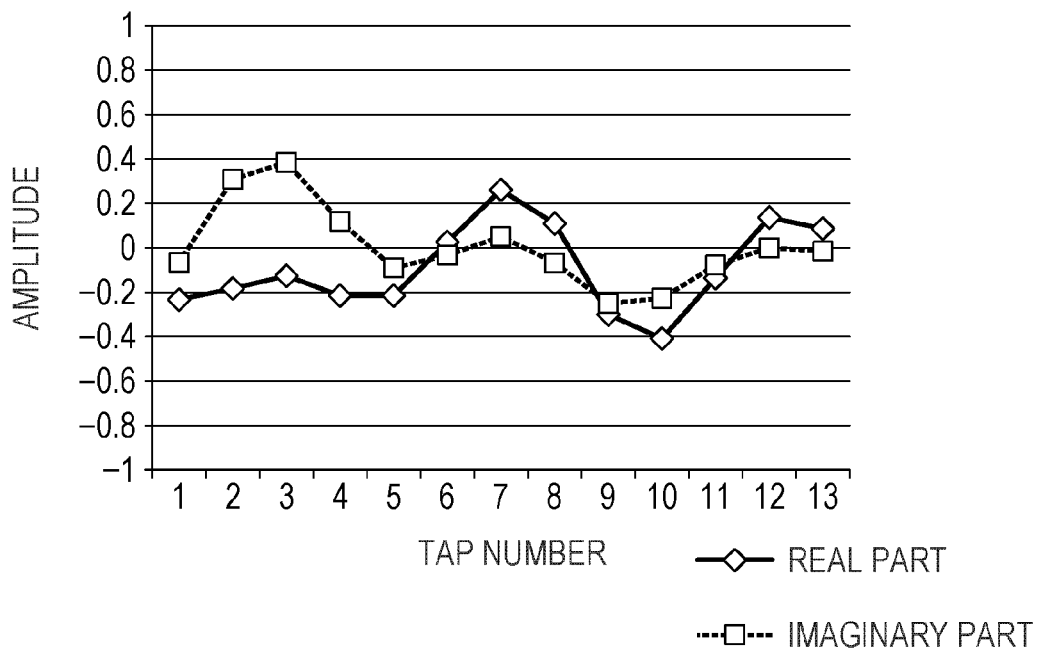
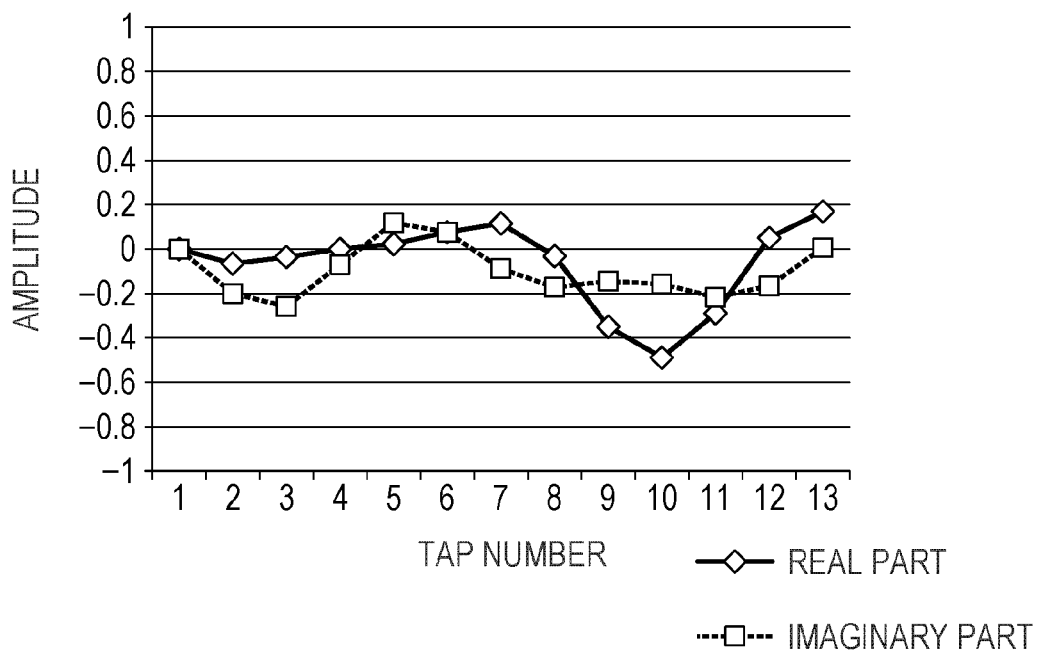

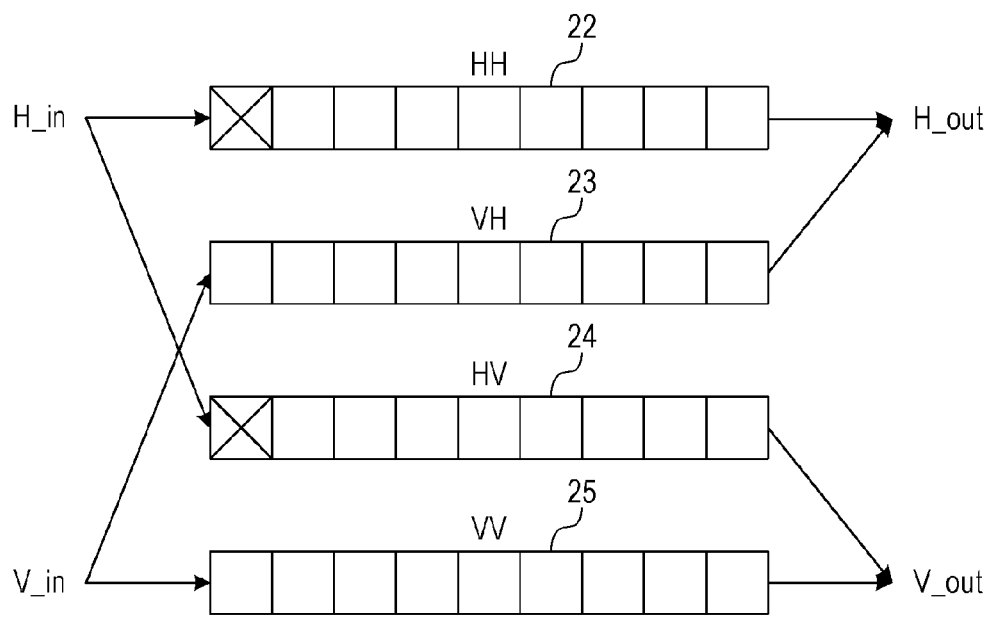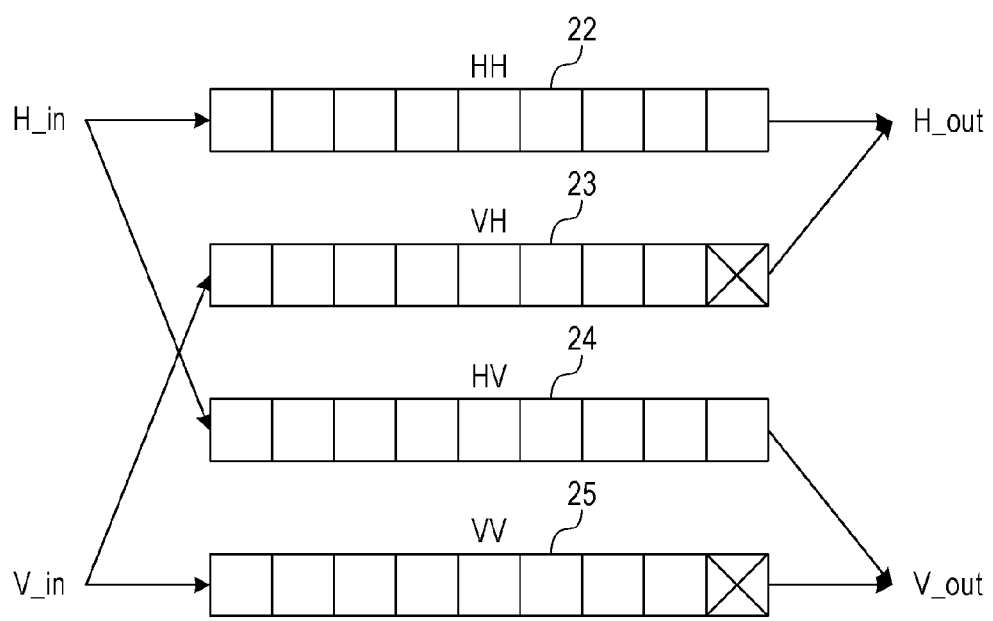

OPTICAL RECEIVING DEVICE

CROSS-REFERENCE TO RELATED APPLICATION

This application is based upon and claims the benefit of priority of the prior Japanese Patent Application No. 2013-265429, filed on Dec. 24, 2013, the entire contents of which are incorporated herein by reference.

FIELD

The embodiment discussed herein is related to an optical receiving device.

BACKGROUND

In the past, as an optical receiving device, there has been an optical receiving device including an adaptive equalizer that adaptively equalizes residual chromatic dispersion, polarization mode dispersion, or waveform distortion. There has been disclosed a technique in which, in order to optimize tap coefficients serving as parameters of an adaptive equalizer, a weighted center position of a filtering shape determined by the tap coefficients is calculated and the tap coefficients are shifted so that a difference between the calculation result and the center of the taps of the adaptive equalizer is minimized. Such a technique has been disclosed in, for example, Japanese Laid-open Patent Publication No. 2012-119923.

In some cases, owing to a contributing factor such as disturbance, polarization rotation, an inter-polarization delay difference (a differential group delay: DGD), or a difference in loss between polarized waves (a polarization dependent loss: PDL) occurs in an optical signal that travels through a transmission path. The inter-polarization delay difference appears as a difference in a temporal direction between tap coefficients of a finite impulse response (FIR) filter, in other words, a difference in tap number. Therefore, in a case where the inter-polarization delay difference is large, tap coefficients whose weights are large occur in both of a small tap number and a large tap number, in some cases.

In addition, the difference in loss between polarized waves appears as a difference in weight between the tap coefficients. Therefore, in a case where the difference in loss between polarized waves is large, a difference occurs between the weight of a tap coefficient whose tap number is small and the weight of a tap coefficient whose tap number is large, in some cases. In that case, if the weighted center position of a filtering shape determined by the tap coefficients is obtained by dividing the sum of values by the sum of the weights of the tap coefficients, the values being obtained by multiplying the tap numbers by the weights of the tap coefficients, the obtained weighted center position is shifted to a side on which a tap coefficient whose weight is larger is located, compared with an expectation value.

In a technique of the related art, the tap coefficients are shifted so that a difference between the weighted center position and the center of taps is minimized. Therefore, if the weighted center position is different from the expectation value, some of tap coefficients having weights are discarded, in some cases. In other words, in a case where the inter-polarization delay difference and the difference in loss between polarized waves occur, it is difficult to generate tap coefficients for compensating the inter-polarization delay difference and the difference in loss between polarized waves, in some cases. In that case, since it is difficult to obtain parameters of the adaptive equalizer, which are capable of adapting to a disturbance at the time of communication, it becomes difficult to expect to further improve the reception performance of an optical receiver.

SUMMARY

According to an aspect of the embodiments, an optical receiving device includes: an adaptive equalizer that includes a position estimation unit configured to estimate, based on a first signal component and a second signal component of a reception signal generated by reception of a training sequence pattern transmitted from an optical transmitter, a symbol position of the reception signal, and generates an estimated symbol position, a delay unit configured to provide a delay difference between the first signal component and the second signal component, a control unit configured to set a plurality of symbol displacement amount candidates of displacement amounts for the estimated symbol position, causes the delay unit to generate a plurality of delay differences, and generates a channel estimation symbol position used for channel estimation, and an error rate calculation unit configured to calculate an error rate of the signal restored by an adaptive equalization unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 9 is a diagram illustrating an example of a matrix of error rates obtained by execution of the processing operations illustrated in FIG. 6 to FIG. 8;

FIG. 10 is a diagram illustrating an example of a table that collects a delay difference whose absolute value is maximized for each symbol displacement amount candidate;

FIG. 14 is a diagram illustrating examples of tap coefficients for an HV N-tap FIR filter at the time of the delay difference of 0;

FIG. 15 is a diagram illustrating examples of tap coefficients for a VV N-tap FIR filter at the time of the delay difference of 0;

FIG. 32 is a diagram illustrating examples of settings of a delay difference of +1, Dhp round-up, and Dvs round-down in the adaptive equalizer illustrated in FIG. 29;

FIG. 33 is a diagram illustrating examples of settings of the delay difference of +1, Dhp round-down, and Dvs round-up in the adaptive equalizer illustrated in FIG. 29;

DESCRIPTION OF EMBODIMENT

Hereinafter, a preferred embodiment of this optical receiving device will be described in detail with reference to accompanying drawings. In the following description of each example, a same reference symbol will be assigned to a same configuration element, and the redundant description thereof will be omitted.

[Example of Optical Receiving Device]

Figure 1:
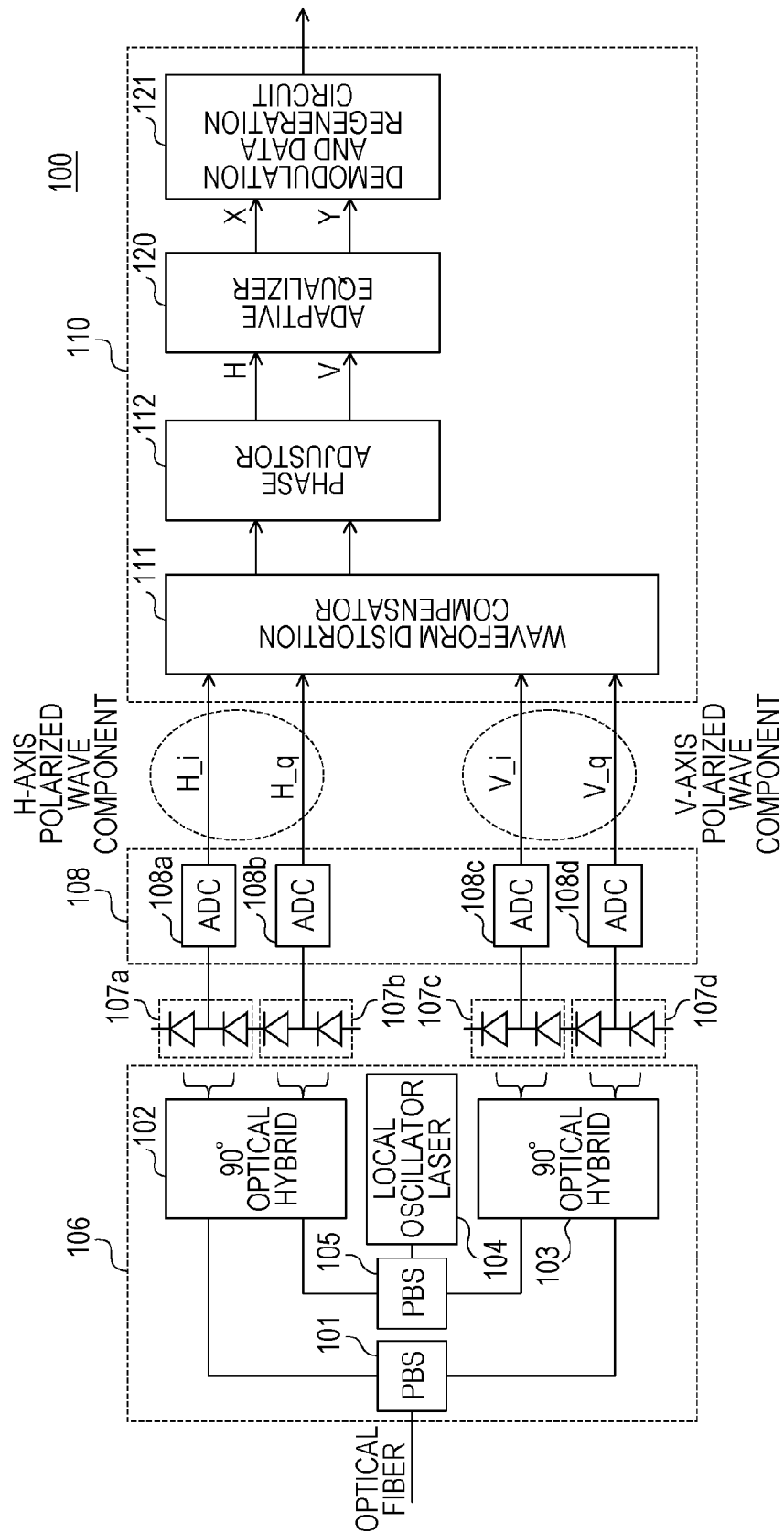
FIG. 1 is a diagram illustrating an example of an optical receiving device according to an embodiment.

FIG. 1 is a diagram illustrating an example of an optical receiving device according to the embodiment. As illustrated in FIG. 1, as an example of the optical receiving device, for example, an optical digital coherent receiver may be cited.

An optical signal that propagates through an optical fiber and is received by an optical receiving device 100 is separated by an polarization beam splitter 101 into H-axis polarized light and V-axis polarized light, and the H-axis polarized light and the V-axis polarized light are input to 90-degree optical hybrid mixers 102 and 103, respectively. On the other hand, the output of a local oscillator laser 104 is individually input to the 90-degree optical hybrid mixers 102 and 103 through a polarization beam splitter 105.

In the 90-degree optical hybrid mixer 102, the input H-axis polarized light is mixed with local oscillation light, separated into an I-channel (in-phase) component and a Q-channel (quadrature) component, and output. The output in-phase component and quadrature component are subjected to photoelectric conversion in corresponding twin photodiodes 107a and 107b, and converted into digital signals in A/D converters 108a and 108b.

On the other hand, in the 90-degree optical hybrid mixer 103, the V-axis polarized light is mixed with the local oscillation light, separated into an I-channel (in-phase) component and a Q-channel (quadrature) component, and output. The output in-phase component and quadrature component are subjected to photoelectric conversion in corresponding twin photodiodes 107c and 107d, and converted into digital signals in A/D converters 108c and 108d.

The digital-converted signal components of the H-axis polarized light and the digital-converted signal components of the V-axis polarized light are individually input to a digital signal processing circuit 110. A polarized wave separation unit 106 may include the polarization beam splitters 101 and 105, the 90-degree optical hybrid mixers 102 and 103, the local oscillator laser 104, and the twin photodiodes 107a, 107b, 107c, and 107d. A digital conversion unit 108 may include the A/D converters 108a, 108b, 108c, and 108d.

In the digital signal processing circuit 110, the distortion component of each signal component is reduced in a waveform distortion compensator 111, and each signal component is subjected to phase adjustment in a phase adjustor 112, and input to an adaptive equalizer 120. The outputs of each of the waveform distortion compensator 111 and the phase adjustor 112 are an H-axis polarized wave component including an in-phase component and a quadrature component in an H-axis direction, and a V-axis polarized wave component including an in-phase component and a quadrature component in a V-axis direction. The digital signal processing circuit 110 is an example of a digital signal processing unit. The H-axis polarized wave component is an example of a first signal component, and the V-axis polarized wave component is an example of a second signal component.

The adaptive equalizer 120 separates a transmission X component and a transmission Y component from the received H component and V component, and adaptively equalizes residual chromatic dispersion and polarization mode dispersion, which are the residues of equalization performed by the waveform distortion compensator 111, and a waveform distortion component due to band limiting of wavelength multiplexing or the like. The separated transmission X component and transmission Y component are input to a demodulation and data regeneration circuit 121 and demodulated, and thus, transmission data is regenerated.

[First Example of Adaptive Equalizer]

Figure 2:
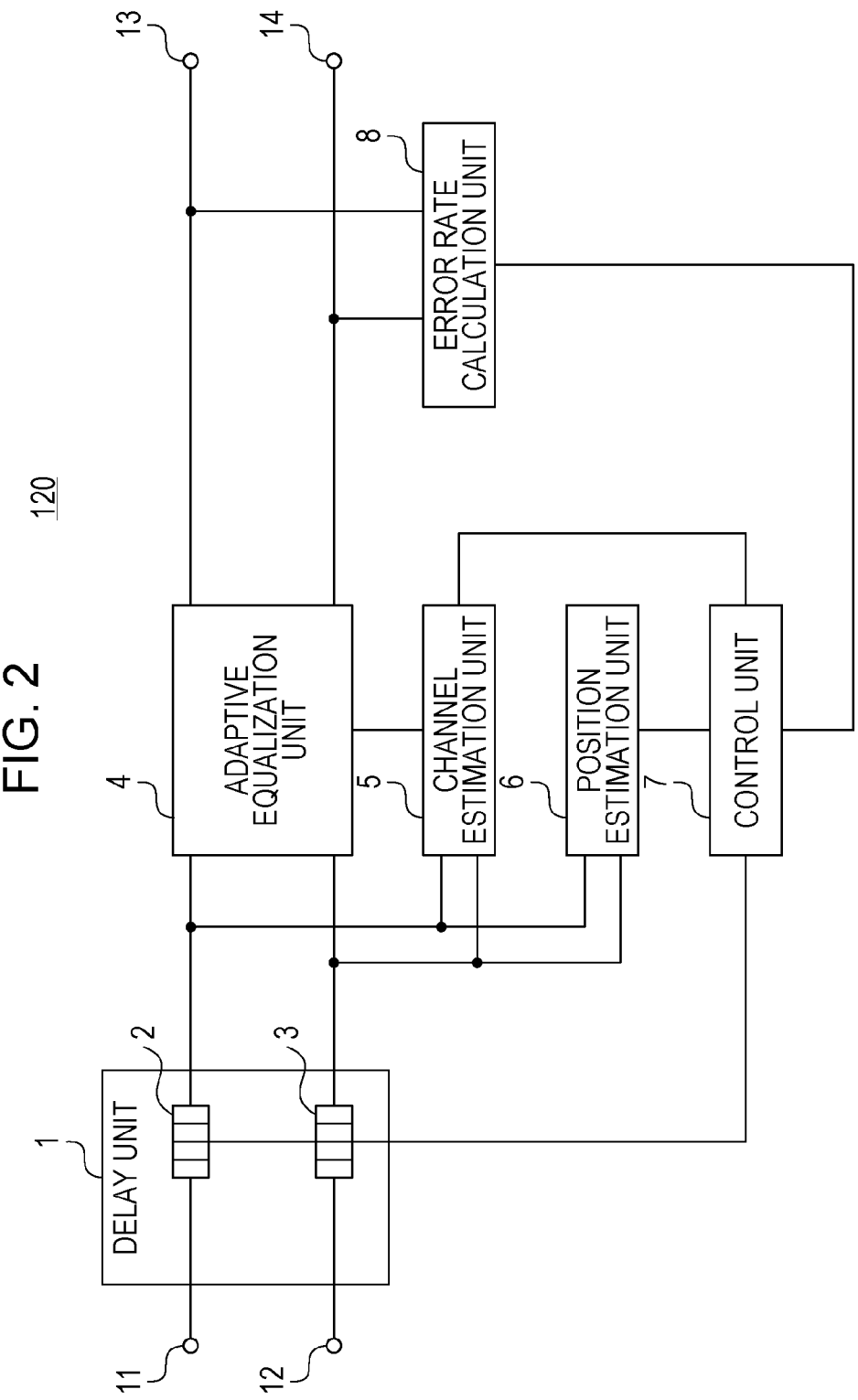
FIG. 2 is a diagram illustrating a first example of an adaptive equalizer in the optical receiving device according to the embodiment.
Figure 3:
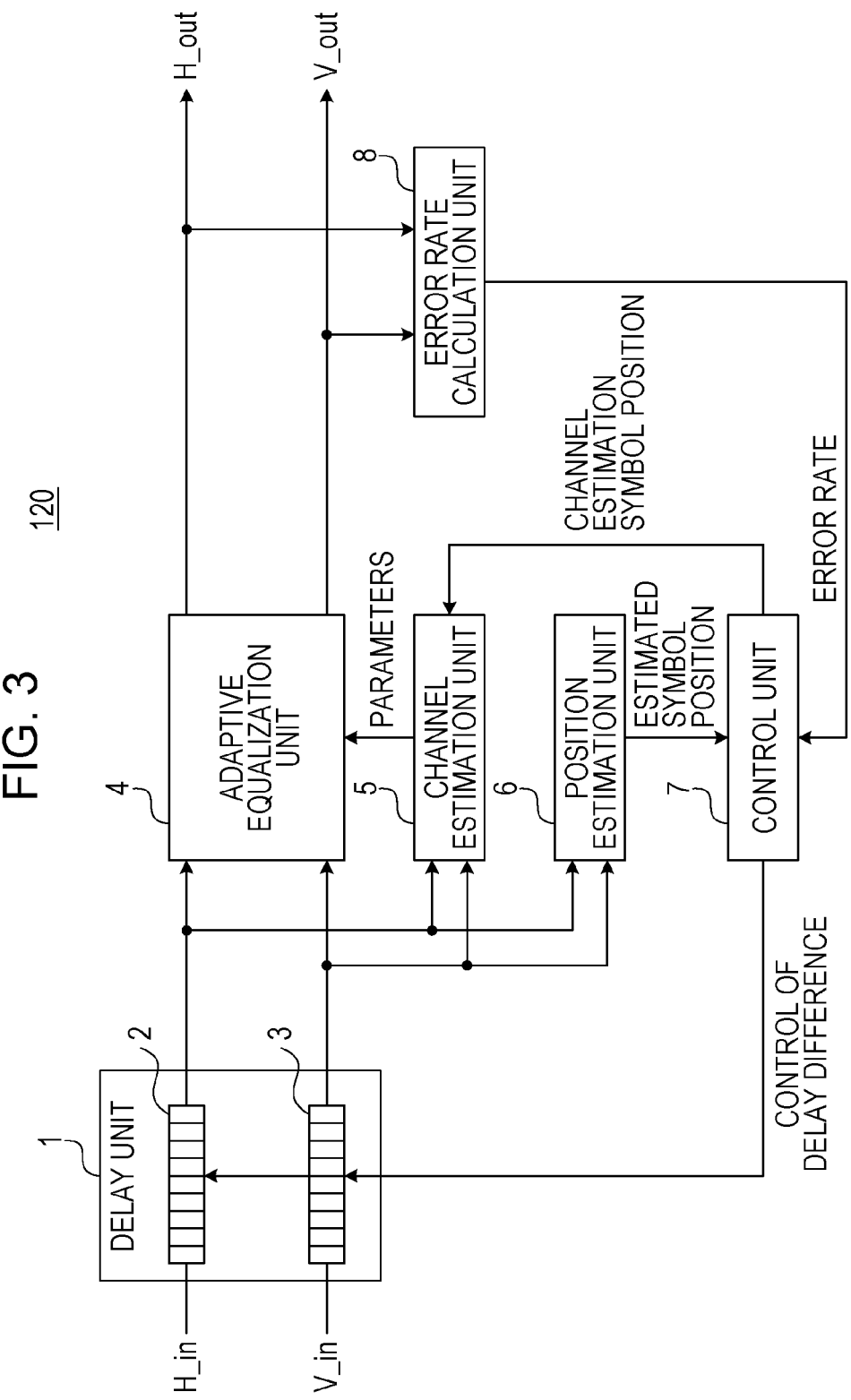
FIG. 3 is a diagram illustrating a flow of a signal in the adaptive equalizer illustrated in FIG. 2.

FIG. 2 is a diagram illustrating a first example of an adaptive equalizer in the optical receiving device according to the embodiment. FIG. 3 is a diagram illustrating the flow of a signal in the adaptive equalizer illustrated in FIG. 2. An adaptive equalizer 120 illustrated in FIG. 2 is an example of the adaptive equalizer in the optical receiving device illustrated in FIG. 1.

As illustrated in FIG. 2 and FIG. 3, the adaptive equalizer 120 includes a delay unit 1. The delay unit 1 may include, for example, at least a first variable delay buffer 2 and a second variable delay buffer 3. In addition, the adaptive equalizer 120 includes an adaptive equalization unit 4, a channel estimation unit 5, a position estimation unit 6, a control unit 7, and an error rate calculation unit 8. Each of the first variable delay buffer 2 and the second variable delay buffer 3 may be configured using a first-in first-out (FIFO) circuit.

The optical receiving device 100 (see FIG. 1) receives a known signal transmitted from an optical transmitter not illustrated. A symbol of a training sequence pattern prearranged between the optical transmitter and the optical receiving device 100 is an example of the known signal. From this point forward, an explanation will be given under the assumption that the known signal is a symbol of the training sequence pattern. A symbol of the training sequence pattern is periodically inserted into a transmission signal output from the optical transmitter, and the content and the insertion interval of the training sequence pattern is preliminarily understood in the optical receiving device 100.

In the present specification, a symbol of the training sequence pattern is called a TS symbol in some cases. In addition, the TS symbol inserted into the transmission signal by the optical transmitter is called a transmission TS symbol, and a reception signal caused by reception of the TS symbol by the optical receiving device 100 is called a reception TS symbol, in some cases. In the digital signal processing circuit 110 (see FIG. 1), the optical receiving device 100 generates, from the reception TS symbol, a first signal component serving as, for example, the H-axis polarized wave component and a second signal component serving as, for example, the V-axis polarized wave component.

The first variable delay buffer 2 is connected to a first input terminal 11 of the adaptive equalizer 120 and the control unit 7 therein. The first input terminal 11 may be connected to, for example, the phase adjustor 112 in the optical receiving device 100 (see FIG. 1). A first signal component H_in is input from the first input terminal 11 to the first variable delay buffer 2.

The second variable delay buffer 3 is connected to a second input terminal 12 of the adaptive equalizer 120 and the control unit 7 therein. The second input terminal 12 may be connected to, for example, the phase adjustor 112 in the optical receiving device 100 (see FIG. 1). A second signal component V_in is input from the second input terminal 12 to the second variable delay buffer 3.

Based on a difference in the number of buffer stages between the first variable delay buffer 2 and the second variable delay buffer 3, the delay unit 1 provides a delay difference between the first signal component H_in and the second signal component V_in. The number of buffer stages of the first variable delay buffer 2, in other words, the delay amount of a signal that passes through the first variable delay buffer 2 is controlled by the control unit 7. The number of buffer stages of the second variable delay buffer 3, in other words, the delay amount of a signal that passes through the second variable delay buffer 3 is controlled by the control unit 7.

For convenience sake, in a description from this point forward, it is assumed that a case where the number of buffer stages of the first variable delay buffer 2 is larger than the number of buffer stages of the second variable delay buffer 3 corresponds to a plus delay difference. In addition, it is assumed that a case where the number of buffer stages of the first variable delay buffer 2 is smaller than the number of buffer stages of the second variable delay buffer 3 corresponds to a minus delay difference.

The position estimation unit 6 is connected to the first variable delay buffer 2 and the second variable delay buffer 3. Based on the first signal component H_in and the second signal component V_in that pass through the first variable delay buffer 2 and the second variable delay buffer 3, respectively, the position estimation unit 6 estimates the symbol position of the reception signal, and generates an estimated symbol position. The position estimation unit 6 may estimate the symbol position of the reception signal using the related art.

When the position estimation unit 6 generates the estimated symbol position, both the number of buffer stages of the first variable delay buffer 2 and the number of buffer stages of the second variable delay buffer 3 are controlled so as to be 0 by the control unit 7. In other words, both the delay amount of the first signal component H_in in the first variable delay buffer 2 and the delay amount of the second signal component V_in in the second variable delay buffer 3 are "0", and a delay difference added between the first signal component H_in and the second signal component V_in by the delay unit 1 is "0"

The control unit 7 is connected to the position estimation unit 6 and the error rate calculation unit 8. For the estimated symbol position generated by the position estimation unit 6, the control unit 7 sets a plurality of symbol displacement amount candidates for a symbol displacement amount. If the error range of the estimated symbol position is preliminarily understood, symbol positions included in the error range are candidates for the correct symbol position of the TS symbol.

The correct symbol position of the TS symbol is a symbol position at which parameters, set in the adaptive equalizer 120 and able to compensate a maximum inter-polarization delay difference as a channel estimation result, are obtained.

The symbol displacement amount is a symbol difference between the correct symbol position and the estimated symbol position, and each of the symbol displacement amount candidates is a symbol difference between a candidate for the correct symbol position and the estimated symbol position. If the error range of the estimated symbol position is, for example, ±3 symbols, in other words, 7 ranging from −3 to +3, the symbol displacement amount candidates are −3, −2, −1, 0, +1, +2, and +3.

In a case where the error range of the estimated symbol position is not preliminarily understood, the number of tap stages of an FIR filter included in, for example, the adaptive equalization unit 4 may be regarded as the symbol displacement amount candidates. Even in a case where the error range of the estimated symbol position is preliminarily understood, in a case where the error range thereof is larger than the number of tap stages of the FIR filter included in the adaptive equalization unit 4, the number of tap stages of the FIR filter may be regarded as the symbol displacement amount candidates.

The control unit 7 controls the number of buffer stages of the first variable delay buffer 2 and the number of buffer stages of the second variable delay buffer 3, and causes the delay unit 1 to generate a plurality of delay differences. The control unit 7 may cause the delay unit 1 to generate delay differences in increments of 1, which range from a value obtained by multiplying and dividing the number of tap stages of the FIR filter by −1 and 2, respectively, to a value obtained by dividing the number of tap stages of the FIR filter by 2. If the number of tap stages of the FIR filter is, for example, 13, the delay differences caused to be generated by the delay unit 1 are −6, −5, −4, −3, −2, −1, 0, +1, +2, +3, +4, +5, and +6.

In addition, the control unit 7 causes the delay unit 1 to generate delay differences in increments of 1, which range from a value obtained by multiplying and dividing a maximum inter-polarization delay difference desired to be compensated by −1 and 2, respectively, to a value obtained by dividing the maximum inter-polarization delay difference desired to be compensated by 2. The maximum inter-polarization delay difference desired to be compensated may be a target value set in, for example, the design stage of the adaptive equalizer 120.

If the maximum inter-polarization delay difference desired to be compensated is, for example, 4, the delay differences caused to be generated by the delay unit 1 are −2, −1, 0, +1, and +2. In a case where the maximum inter-polarization delay difference desired to be compensated is smaller than the number of tap stages of the FIR filter, the delay unit 1 may be caused to generate the delay differences, based on the maximum inter-polarization delay difference desired to be compensated.

In addition, the control unit 7 generates a channel estimation symbol position. The channel estimation symbol position is used when the channel estimation unit 5 performs estimation of a channel.

In addition, the control unit 7 acquires, from the error rate calculation unit 8, an error rate for each of the plural delay differences with respect to each of the plural symbol displacement amount candidates. In addition, the control unit 7 obtains a final channel estimation symbol position so that the acquired error rate is less than or equal to a reference value and a delay difference between the first signal component H_in and the second signal component V_in, based on the delay unit 1, becomes as large as possible.

The channel estimation unit 5 is connected to the first variable delay buffer 2, the second variable delay buffer 3, and the control unit 7. Based on the channel estimation symbol position generated by the control unit 7, the channel estimation unit 5 performs channel estimation on a transmission path with the optical transmitter, using the first signal component H_in and the second signal component V_in that pass through the first variable delay buffer 2 and the second variable delay buffer 3, respectively. The channel estimation unit 5 is able to perform channel estimation, from a difference between the reception TS symbol and the transmission TS symbol.

The channel estimation unit 5 generates parameters for realizing a characteristic opposite to a transmission path characteristic obtained by the channel estimation. Based on the final channel estimation symbol position, the channel estimation unit 5 generates the initial values of parameters to be set in the adaptive equalization unit 4. Tap coefficients for the FIR filter included in the adaptive equalization unit 4 are examples of the parameters.

Until the control unit 7 obtains the final channel estimation symbol position, the delay unit 1 adds a delay difference to the input first signal component H_in and the second signal component V_in input to the channel estimation unit 5. On the other hand, after the control unit 7 obtains the final channel estimation symbol position, a delay difference added between the first signal component H_in and the second signal component V_in by the delay unit 1 becomes "0".

The adaptive equalization unit 4 is connected to the first variable delay buffer 2, the second variable delay buffer 3, and the channel estimation unit 5. The parameters generated by the channel estimation unit 5 are set in the adaptive equalization unit 4. The adaptive equalization unit 4 performs adaptive equalization on the first signal component H_in and the second signal component V_in that pass through the first variable delay buffer 2 and the second variable delay buffer 3, respectively, and restores the signal transmitted from the optical transmitter, not illustrated, and received by the optical receiving device 100 (see FIG. 1).

Until the initial values of the parameters are set in the adaptive equalization unit 4, the adaptive equalization unit 4 performs adaptive equalization on the first signal component H_in and the second signal component V_in to which the delay difference is provided by the delay unit 1. Accordingly, the adaptive equalization unit 4 restores the reception TS symbol.

On the other hand, after the initial values of the parameters are set in the adaptive equalization unit 4 by the channel estimation unit 5, the delay difference added between the first signal component H_in and the second signal component V_in by the delay unit 1 becomes "0". In other words, the adaptive equalization unit 4 performs adaptive equalization on the first signal component H_in and the second signal component V_in to which no delay difference is added by the delay unit 1.

Accordingly, after the setting of the initial values of the parameters, the adaptive equalization unit 4 restores the signal transmitted from the optical transmitter not illustrated, and outputs a first signal component H_out and a second signal component V_out from a first output terminal 13 and a second output terminal 14, respectively, of the adaptive equalizer 120. The first output terminal 13 and the second output terminal 14 may be connected to, for example, the demodulation and data regeneration circuit 121 in the optical receiving device 100 (see FIG. 1). In FIG. 1, the first signal component H_out and the second signal component V_out are expressed as the transmission X component and the transmission Y component, respectively.

The error rate calculation unit 8 is connected to the adaptive equalization unit 4. Based on the first signal component H_out and the second signal component V_out output from the adaptive equalization unit 4, the error rate calculation unit 8 calculates the error rate of the reception TS symbol restored by the adaptive equalization unit 4 with respect to the transmission TS symbol. A bit error rate is an example of the error rate.

The error rate calculation unit 8 may obtain the error rate using forward error correction (FEC). Alternatively, the error rate calculation unit 8 may obtain the error rate by comparing reception data whose pattern is preliminarily understood and a pattern preliminarily understood with each other so as to compare the reception TS symbol and the transmission TS symbol with each other, and may obtain the error rate from the dispersion of a demodulated symbol, using known software processing.

[Example of Adaptive Equalization Unit]

Figure 4:
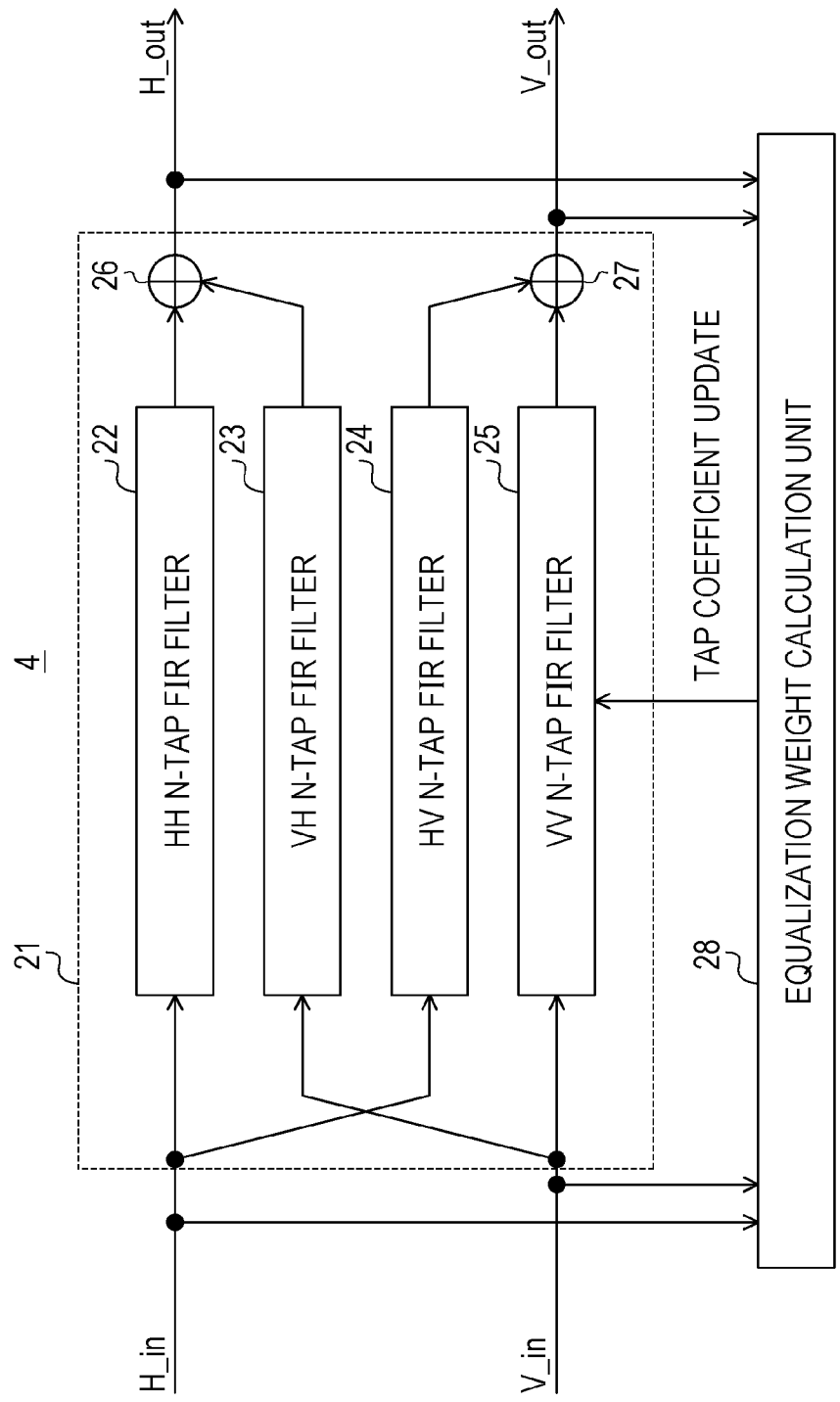
FIG. 4 is a diagram illustrating an example of an adaptive equalization unit in the adaptive equalizer illustrated in FIG. 2.

FIG. 4 is a diagram illustrating an example of the adaptive equalization unit in the adaptive equalizer illustrated in FIG. 2. As illustrated in FIG. 4, the adaptive equalization unit 4 includes an FIR filter unit 21 that performs equalization of a reception signal, and an equalization weight calculation unit 28 that performs adaptive control of the tap coefficients. While, for convenience of illustration, in FIG. 4, only one FIR filter unit 21 is illustrated, M FIR filter units 21 are used in a case of performing, for example, M-parallel processing.

In the example illustrated in FIG. 4, the FIR filter unit 21 performs FIR calculation by cross multiplication of the H component and the V component. The FIR filter unit 21 includes an HH N-tap FIR filter 22 and a VH N-tap FIR filter 23, used for an X-axis polarized wave, and an HV N-tap FIR filter 24 and a VV N-tap FIR filter 25, used for a Y-axis polarized wave.

From among the output signals from the phase adjustor 112 (see FIG. 1), the H-axis polarized wave component including the in-phase component and the quadrature component is input to the HH N-tap FIR filter 22, the HV N-tap FIR filter 24, and the equalization weight calculation unit 28. The HH N-tap FIR filter 22 extracts, from an H polarized wave component, an X-axis polarized wave component in polarization multiplexing. The HV N-tap FIR filter 24 extracts, from the H polarized wave component, a Y-axis polarized wave component in polarization multiplexing.

From among the output signals from the phase adjustor 112 (see FIG. 1), the V-axis polarized wave component including the in-phase component and the quadrature component is input to the VH N-tap FIR filter 23, the VV N-tap FIR filter 25, and the equalization weight calculation unit 28. The VH N-tap FIR filter 23 extracts, from a V polarized wave component, an X-axis polarized wave component in polarization multiplexing. The VV N-tap FIR filter 25 extracts, from the V polarized wave component, a Y-axis polarized wave component in polarization multiplexing.

The output signal of the HH N-tap FIR filter 22 and the output signal of the VH N-tap FIR filter 23 are input to an X-side adder 26. A signal of the equalized X-axis polarized wave component is output from the X-side adder 26. The output signal of the X-side adder 26 is input to the equalization weight calculation unit 28. In addition, the output signal of the X-side adder 26 may be input to the demodulation and data regeneration circuit 121 (see FIG. 1).

The output signal of the HV N-tap FIR filter 24 and the output signal of the VV N-tap FIR filter 25 are input to a Y-side adder 27. A signal of the equalized Y-axis polarized wave component is output from the Y-side adder 27. The output signal of the Y-side adder 27 is input to the equalization weight calculation unit 28. In addition, the output signal of the Y-side adder 27 may be input to the demodulation and data regeneration circuit 121 (see FIG. 1).

In order to adaptively update the tap coefficients, the equalization weight calculation unit 28 uses an arbitrary algorithm. As such an algorithm, for example, a constant modulus algorithm (CMA) and a decision-directed least mean square algorithm (DD-LMS) have been known.

In the adaptive equalizer 120 illustrated in FIG. 2, the first variable delay buffer 2, the second variable delay buffer 3, and the adaptive equalization unit 4 are each realized using hardware. The channel estimation unit 5, the position estimation unit 6, the control unit 7, and the error rate calculation unit 8 may be each realized using hardware or may be each realized using software.

Figure 5:
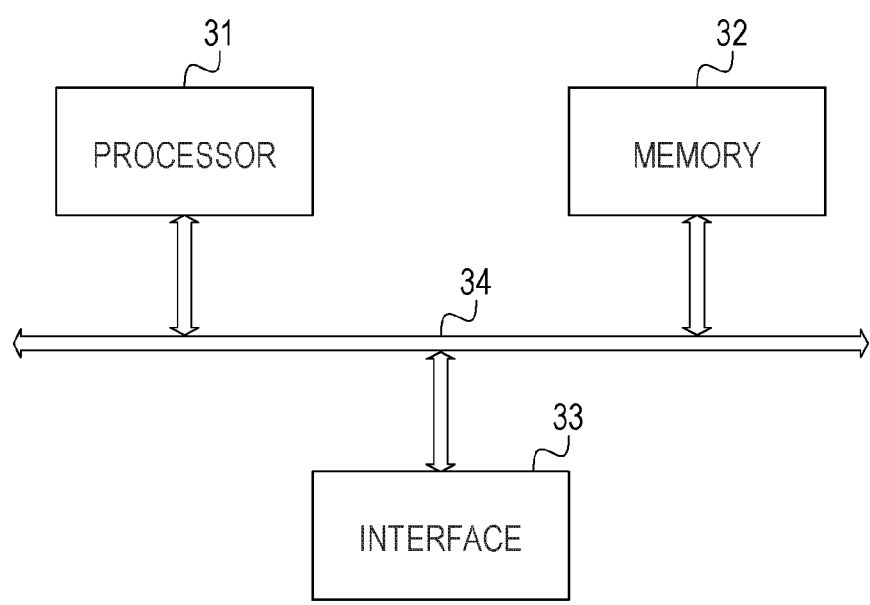
FIG. 5 is a diagram illustrating an example of a hardware configuration in a case where a channel estimation unit, a position estimation unit, a control unit, and an error rate calculation unit in the adaptive equalizer illustrated in FIG. 2 are realized using software.

FIG. 5 is a diagram illustrating an example of a hardware configuration in a case where the channel estimation unit, the position estimation unit, the control unit, and the error rate calculation unit in the adaptive equalizer illustrated in FIG. 2 are realized using software. As illustrated in FIG. 5, a processor 31 such as a central processing unit (CPU) or a digital signal processor (DSP) executes a program stored in a memory 32, and thus, the channel estimation unit 5, the position estimation unit 6, the control unit 7, and the error rate calculation unit 8 (see FIG. 2) may be realized. The memory 32 may be configured using a random access memory (RAM).

The processor 31, the memory 32, and an interface 33 may be connected to a bus 34. The interface 33 manages inputting of the first signal component H_in and the second signal component V_in from the first variable delay buffer 2 and the second variable delay buffer 3, respectively, and inputting of the first signal component H_out and the second signal component V_out from the adaptive equalization unit 4. In addition, the interface 33 manages outputting of control signals to the first variable delay buffer 2 and the second variable delay buffer 3, and outputting of parameters to the adaptive equalization unit 4.

[Example of Processing in Adaptive Equalizer]

Figure 6:
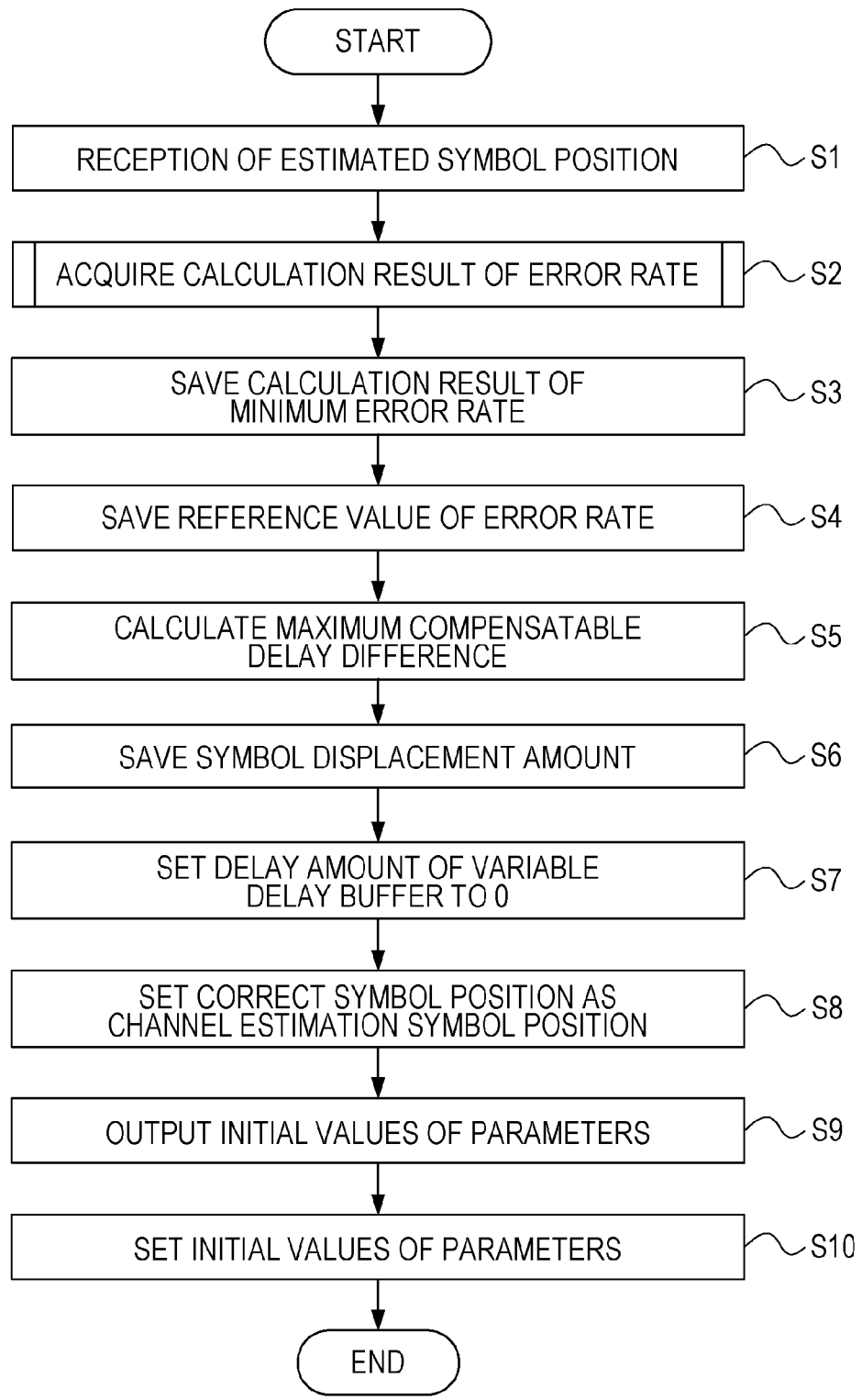
FIG. 6 is a diagram illustrating an example of a flow of processing in the adaptive equalizer illustrated in FIG. 2.
Figure 7:
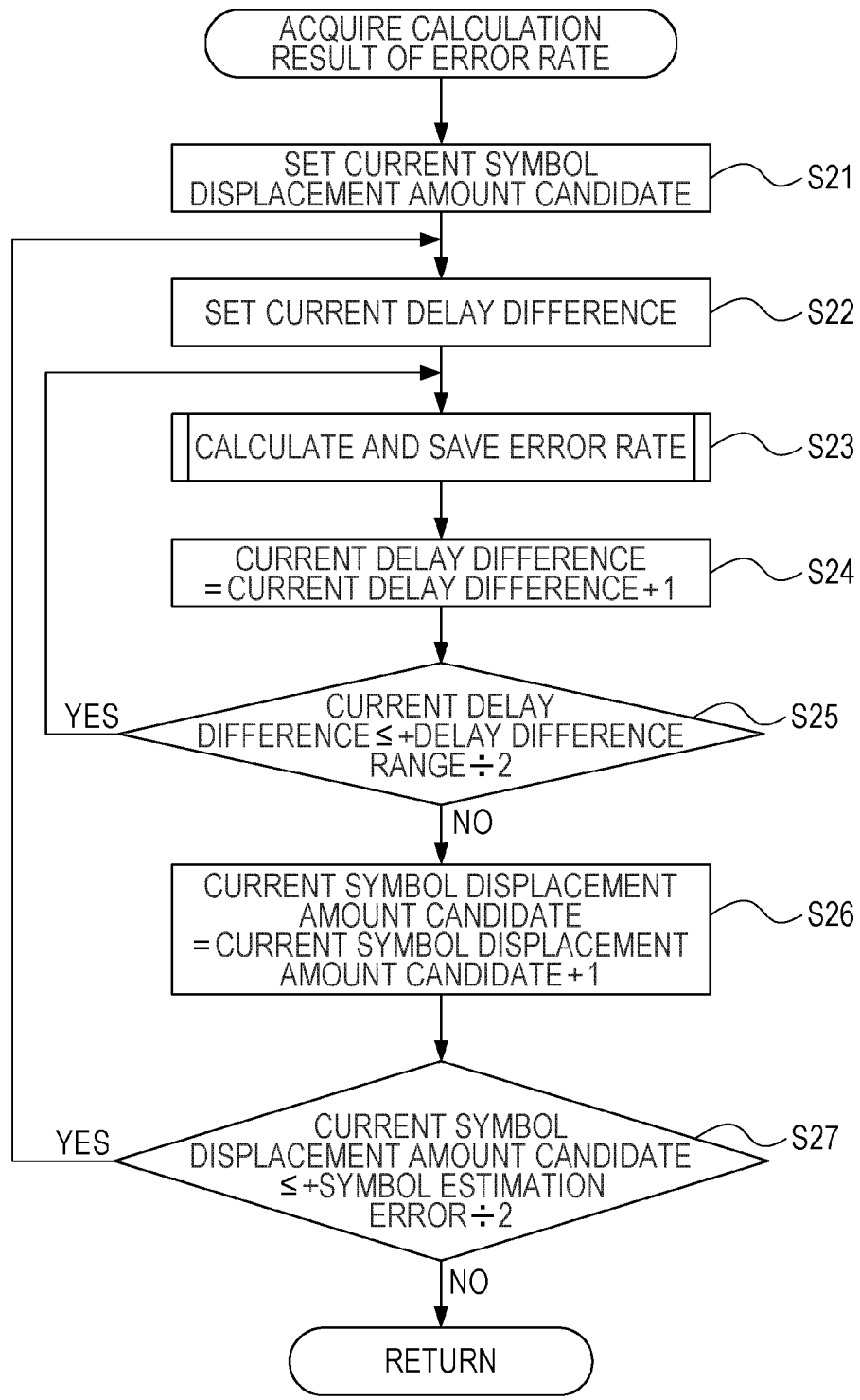
FIG. 7 is a diagram illustrating an example of processing for acquiring a calculation result of an error rate in the processing illustrated in FIG. 6.
Figure 8:
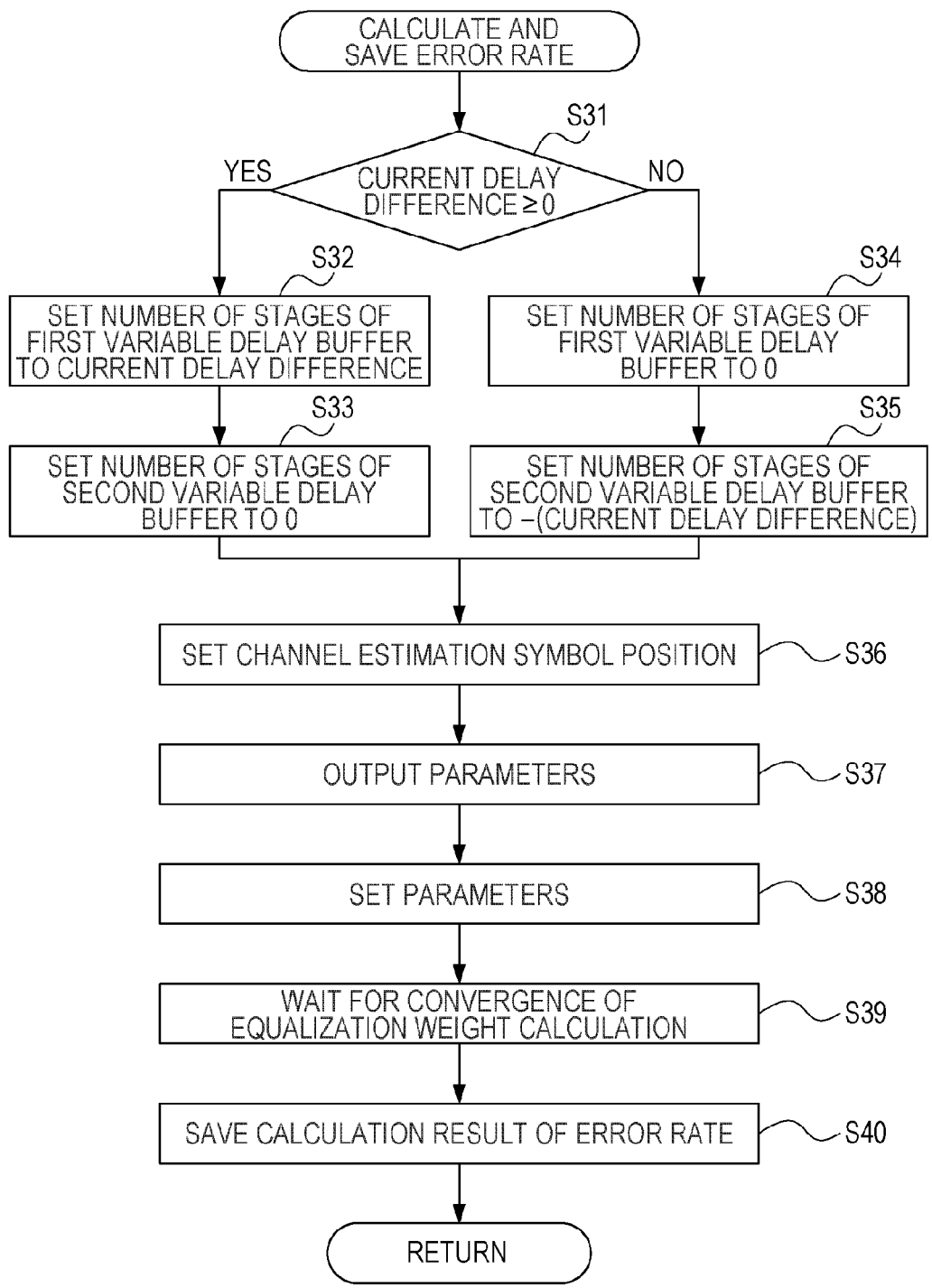
FIG. 8 is a diagram illustrating an example of processing for calculating and saving the error rate in the processing illustrated in FIG. 7.

FIG. 6 is a diagram illustrating an example of the flow of processing in the adaptive equalizer illustrated in FIG. 2. FIG. 7 is a diagram illustrating an example of processing for acquiring a calculation result of an error rate in the processing illustrated in FIG. 6. FIG. 8 is a diagram illustrating an example of processing for calculating and saving the error rate in the processing illustrated in FIG. 7. FIG. 9 is a diagram illustrating an example of a matrix of error rates obtained by execution of the processing operations illustrated in FIG. 6 to FIG. 8. FIG. 10 is a diagram illustrating an example of a table that collects a delay difference whose absolute value is maximized for each symbol displacement amount candidate.

If initializing processing for the adaptive equalizer 120 (see FIG. 1) is started, the control unit 7 waits until reception of the estimated symbol position from the position estimation unit 6, as illustrated in FIG. 6. Upon receiving the estimated symbol position from the position estimation unit 6 (step S1), the control unit 7 performs processing for acquiring a calculation result of an error rate (step S2).

If the processing for acquiring a calculation result of an error rate is started, the control unit 7 sets a current symbol displacement amount candidate, as illustrated in FIG. 7 (step S21). If a smaller one of the error range of the estimated symbol position and the number of tap stages of the FIR filter included in the adaptive equalization unit 4 is called a symbol estimation error, the control unit 7 may set a value obtained by multiplying and dividing the value of the symbol estimation error by, for example, −1 and 2, respectively, as the current symbol displacement amount candidate. In a case where a smaller one of the number of tap stages and the error range of the estimated symbol position, in other words, the value of the symbol estimation error is, for example, 7, if a value obtained by dividing by 2 is rounded down to the closest whole number, the current symbol displacement amount candidate is −3.

In addition, the control unit 7 sets a current delay difference based on the delay unit 1 (step S22). If a smaller one of the number of tap stages of the FIR filter included in the adaptive equalization unit 4 and a maximum inter-polarization delay difference desired to be compensated is called a delay difference range, the control unit 7 may set a value obtained by multiplying and dividing the value of the delay difference range by, for example, −1 and 2, respectively, as the current delay difference. In a case where a smaller one of the number of tap stages and the maximum inter-polarization delay difference desired to be compensated, in other words, the value of the delay difference range is 5, if a value obtained by dividing by 2 is rounded down to the closest whole number, the current delay difference is −2.

There is a case where it is desirable to find the final channel estimation symbol position by changing the delay difference within a limited range. In that case, the delay difference range may be set to a small value than the number of tap stages of the FIR filter included in the adaptive equalization unit 4.

Next, in the control unit 7, processing for calculating an error rate in the combination of the current symbol displacement amount candidate and the current delay difference and saving the calculation result thereof is performed (step S23).

If the processing for calculating and saving the error rate is started, the control unit 7 determines whether or not the current delay difference is greater than or equal to "0", as illustrated in FIG. 8 (step S31). In a case where the current delay difference is greater than or equal to "0" (step S31: Yes), the processing proceeds to a step S32 and a step S33, and in a case where the current delay difference is not greater than or equal to "0" (step S31: No), the processing proceeds to a step S34 and a step S35. On this occasion, since the current delay difference is set to −2 in the step S22, the processing proceeds to the step S34.

Accordingly, the control unit 7 sets the number of buffer stages of the first variable delay buffer 2 to "0" (step S34), and sets the number of buffer stages of the second variable delay buffer 3 to a value obtained by multiplying the current delay difference by −1 (step S35). On this occasion, since the current delay difference is −2, the control unit 7 sets the number of buffer stages of the second variable delay buffer 3 to "2".

Accordingly, the number of buffer stages of the first variable delay buffer 2 becomes "0", and the number of buffer stages of the second variable delay buffer 3 becomes "2". Accordingly, the second signal component Vin turns out to be input to the adaptive equalization unit 4 and the channel estimation unit 5 behind the first signal component H_in by a corresponding amount of passing through buffers of two stages. The control unit 7 may perform the step S35 before the step S34.

Next, the control unit 7 sets the channel estimation symbol position (step S36). The channel estimation symbol position may be a value obtained by adding, to the estimated symbol position received from the position estimation unit 6, the value of the current symbol displacement amount candidate and a value obtained by rounding up or rounding down, to the closest whole number, the absolute value of a value obtained by dividing the current delay difference by 2. On this occasion, since the current symbol displacement amount candidate is −3 and the current delay difference is −2, the channel estimation symbol position becomes a value obtained by adding −2 to the estimated symbol position.

Next, the channel estimation unit 5 performs channel estimation calculation, and outputs parameters to the adaptive equalization unit 4, based on the calculation result thereof (step S37). The adaptive equalization unit 4 sets the parameters received from the channel estimation unit 5 as the tap coefficients of the FIR filter (step S38).

Next, the control unit 7 waits for time taken for equalization weight calculation based on the equalization weight calculation unit 28 in the adaptive equalization unit 4 to converge (step S39). After the waiting, the control unit 7 receives and saves the calculation result of an error rate from the error rate calculation unit 8 (step S40). At this point, an error rate in a case where the current symbol displacement amount candidate is −3 and the current delay difference is −2 turns out to be saved. Accordingly, the control unit 7 terminates the processing for calculating and saving the error rate, returns to the processing for acquiring the calculation result of the error rate illustrated in FIG. 7, and continues processing in and after a step S24.

Upon returning to the processing illustrated in FIG. 7, the control unit 7 defines a value obtained by adding "1" to the current delay difference as a new current delay difference (step S24). In other words, the value of the current delay difference is incremented. On this occasion, the current delay difference becomes −1. Next, the control unit 7 determines whether or not the current delay difference newly set in the step S24 is less than or equal to a value obtained by dividing the value of the delay difference range by, for example, 2 (step S25).

In a case where the value of the delay difference range is, for example, 5, if the value obtained by dividing by 2 is rounded down to the closest whole number, the value obtained by dividing the value of the delay difference range by 2 is 2. Since the current delay difference is −1, the current delay difference is less than or equal to the value obtained by dividing the value of the delay difference range by 2 (step S25: Yes). Accordingly, the control unit 7 returns to the step S23, and performs the processing for calculating and saving the error rate, illustrated in FIG. 8.

In the processing illustrated in FIG. 8, since the current delay difference is not greater than or equal to "0" (step S31: No), the processing operations in the step S34 to the step S40 are performed. Since the processing operations in the step S34 to the step S40 are the same as those in a case where the current symbol displacement amount candidate is −3 and the current delay difference is −2, the redundant descriptions thereof will be omitted.

In this regard, however, on this occasion, since the current delay difference is −1, the control unit 7 sets the number of buffer stages of the second variable delay buffer 3 to 1, in the step S35. Accordingly, the second signal component Vin turns out to be input to the adaptive equalization unit 4 and the channel estimation unit 5 behind the first signal component H_in by a corresponding amount of passing through a buffer of one stage. In addition, in the step S40, an error rate in a case where the current symbol displacement amount candidate is −3 and the current delay difference is −1 turns out to be saved.

Accordingly, the control unit 7 terminates the processing for calculating and saving the error rate, returns again to the processing for acquiring the calculation result of the error rate illustrated in FIG. 7, and continues processing in and after the step S24. The control unit 7 repeatedly performs the processing operations in the step S23 and the step S31 to the step S40, the processing operation in the step S24, and the processing operation in the step S25 until the current delay difference becomes greater than the value obtained by dividing the value of the delay difference range by 2, in the step S25.

In a case where the value of the delay difference range is, for example, 5, if the value obtained by dividing by 2 is rounded down to the closest whole number, the value obtained by dividing the value of the delay difference range by 2 is 2. Therefore, until the current delay difference incremented in the step S24 becomes +3, the processing operations in the step S23 and the step S31 to the step S40, the processing operation in the step S24, and the processing operation in the step S25 are repeated.

At that time, if the current delay difference becomes greater than or equal to "0" (step S31: Yes), the processing operations in the step S32, the step S33, and the step S36 to step S40 are performed. The control unit 7 sets the current delay difference as the number of buffer stages of the first variable delay buffer 2, in the step S32, and the control unit 7 sets the number of buffer stages of the second variable delay buffer 3 to "0", in the step S33. The control unit 7 may perform the step S33 before the step S32.

In a case where the current delay difference is "0" (step S31: Yes), the control unit 7 sets the number of buffer stages of each of the first variable delay buffer 2 and the second variable delay buffer 3 to "0" (step S32 and step S33). Accordingly, both the first signal component H_in and the second signal component V_in turn out to be input to the adaptive equalization unit 4 and the channel estimation unit 5 while no delay is added thereto by the delay unit 1. In addition, in the step S40, an error rate in a case where the current symbol displacement amount candidate is −3 and the current delay difference is 0 turns out to be saved.

In addition, in a case where the current delay difference is +1 (step S31: Yes), the control unit 7 sets the number of buffer stages of the first variable delay buffer 2 to 1, in the step S32. Accordingly, the first signal component H_in turns out to be input to the adaptive equalization unit 4 and the channel estimation unit 5 behind the second signal component V_in by a corresponding amount of passing through a buffer of one stage. In addition, in the step S40, an error rate in a case where the current symbol displacement amount candidate is −3 and the current delay difference is +1 turns out to be saved.

In addition, in a case where the current delay difference is +2 (step S31: Yes), the control unit 7 sets the number of buffer stages of the first variable delay buffer 2 to 2, in the step S32. Accordingly, the first signal component H_in turns out to be input to the adaptive equalization unit 4 and the channel estimation unit 5 behind the second signal component V_in by a corresponding amount of passing through buffers of two stages. In addition, in the step S40, an error rate in a case where the current symbol displacement amount candidate is −3 and the current delay difference is +2 turns out to be saved.

After the processing operation in the step S40, the control unit 7 returns again to the processing for acquiring the calculation result of an error rate illustrated in FIG. 7, and increments the value of the current delay difference (step S24). If, as a result, the new current delay difference becomes greater than the value obtained by dividing the value of the delay difference range by 2 (step S25: No), an error rate in each delay difference in a case where the current symbol displacement amount candidate is −3 turns out to be saved.

Accordingly, the control unit 7 defines a value obtained by adding "1" to the current symbol displacement amount candidate, as a new current symbol displacement amount candidate (step S26). In other words, the value of the current symbol displacement amount candidate is incremented. On this occasion, the current symbol displacement amount candidate becomes −2. Next, the control unit 7 determines whether or not the current symbol displacement amount candidate newly set in the step S26 is less than or equal to a value obtained by dividing the value of the symbol estimation error by, for example, 2 (step S27).

In a case where the value of the symbol estimation error is, for example, 7, if the value obtained by dividing by 2 is rounded down to the closest whole number, the value obtained by dividing the value of the symbol estimation error by 2 is 3. Since the current symbol displacement amount candidate is −2, the current symbol displacement amount candidate is less than or equal to the value obtained by dividing the value of the symbol estimation error by 2 (step S27: Yes).

Accordingly, the control unit 7 returns to the step S22, and sets the current delay difference based on the delay unit 1 (step S22). From this point forward, in the same way as in the above-mentioned case where the current symbol displacement amount candidate is −3, the processing operation in the step S22, the processing operations in the step S23 and the step S31 to step S40, the processing operation in the step S24, and the processing operation in the step S25 are repeated. Accordingly, an error rate in each delay difference in a case where the current symbol displacement amount candidate is −2 turns out to be saved.

If the save processing for the error rate in a case where the current symbol displacement amount candidate is −2 finishes, the control unit 7 increments the value of the current symbol displacement amount candidate (step S26). On this occasion, the current symbol displacement amount candidate becomes −1. Accordingly, since the current symbol displacement amount candidate is less than or equal to the value obtained by dividing the value of the symbol estimation error by 2 (step S27: Yes), an error rate in each delay difference is saved with respect to a case where the current symbol displacement amount candidate is −3.

Until the current symbol displacement amount candidate becomes greater than the value obtained by dividing the value of the symbol estimation error by 2, the processing operation in the step S22, the processing operations in the step S23 and the step S31 to the step S40, and the processing operations in the step S24 to the step S27 are repeated. Accordingly, an error rate in each delay difference is saved with respect to each of cases where the current symbol displacement amount candidates are 0, +1, and +2.

If the new current symbol displacement amount candidate becomes greater than the value obtained by dividing the value of the symbol estimation error by 2, based on the increment in the step S26 (step S27: No), the control unit 7 turns out to acquire error rates for the combinations of all the symbol displacement amount candidates and all the delay differences. By acquiring error rates for the combinations of all the symbol displacement amount candidates and all the delay differences, a matrix 41 of error rates illustrated in, for example, FIG. 9 is obtained. In the matrix 41 of error rates illustrated in FIG. 9, the symbol displacement amount candidates are, for example, −3, −2, −1, 0, +1, +2, and +3, and the delay differences are, for example, −2, −1, 0, +1, and +2.

If such a matrix 41 of error rates as illustrated in FIG. 9 is obtained, the control unit 7 returns again to the processing illustrated in FIG. 6, selects the calculation result of a minimum error rate from among the calculation results of all the acquired error rates, and saves the value thereof (step S3). For example, in a case of the matrix 41 of error rates illustrated in FIG. 9, the calculation result of a minimum error rate is 1%.

Next, the control unit 7 saves, as the reference value of an error rate, a value obtained by multiplying the calculation result of a minimum error rate by arbitrary α (step S4). α may be determined in accordance with an acceptable level of an error rate in an optical communication system in which the optical receiving device 100 is used. For example, α may be 10% of the minimum error rate. In a case of the matrix 41 of error rates illustrated in FIG. 9, if α is, for example, 10%, the reference value of an error rate becomes 1.1%.

Next, the control unit 7 calculates a maximum compensatable delay difference for each symbol displacement amount candidate (step S5). Under the condition that an error rate is less than or equal to the reference value with respect to each of the plural symbol displacement amount candidates, a smaller one of a maximum delay difference in a case where the first signal component H_in is later than the second signal component V_in and a maximum delay difference in a case where the second signal component V_in is later than the first signal component H_in is defined as a maximum compensatable delay difference. In a case where the first signal component H_in is later than the second signal component V_in, a delay difference in a direction where the value thereof is a plus value is adopted. In a case where the second signal component V_in is later than the first signal component H_in, a delay difference in a direction where the value thereof is a minus value is adopted.

If, in the matrix 41 of error rates illustrated in FIG. 9, the reference value for an error rate is, for example, 1.1%, in a case where the symbol displacement amount candidate is −3, a delay difference whose absolute value is a maximum is 2 among delay differences where error rates are less than or equal to 1.1% in a direction in which the delay differences are minus values. On the other hand, in a case where the symbol displacement amount candidate is −3, in a direction where delay differences are plus values, there is no error rate less than or equal to 1.1%. Accordingly, as a table 42 illustrated in FIG. 10, there is no delay difference corresponding to a small one of a delay difference whose absolute value is a maximum in a direction in which the delay difference is a minus value and a delay difference whose absolute value is a maximum in a direction in which the delay difference is a plus value. In other words, in a case where the symbol displacement amount candidate is −3, there is no maximum compensatable delay difference.

In a case where the symbol displacement amount candidate is −2, a delay difference whose absolute value is a maximum is 2 among delay differences where error rates are less than or equal to 1.1% in a direction in which the delay differences are minus values. On the other hand, in a case where the symbol displacement amount candidate is −2, a delay difference whose absolute value is a maximum is 0 among delay differences where error rates are less than or equal to 1.1% in a direction in which the delay differences are plus values. Accordingly, a smaller one of a delay difference whose absolute value is a maximum in a direction in which the delay difference is a minus value and a delay difference whose absolute value is a maximum in a direction in which the delay difference is a plus value is 0. In other words, the maximum compensatable delay difference in a case where the symbol displacement amount candidate is −2 is 0.

In a case where the symbol displacement amount candidate is −1, a delay difference whose absolute value is a maximum is 2 among delay differences where error rates are less than or equal to 1.1% in a direction in which the delay differences are minus values. On the other hand, in a case where the symbol displacement amount candidate is −1, a delay difference whose absolute value is a maximum is 1 among delay differences where error rates are less than or equal to 1.1% in a direction in which the delay differences are plus values. Accordingly, a smaller one of a delay difference whose absolute value is a maximum in a direction in which the delay difference is a minus value and a delay difference whose absolute value is a maximum in a direction in which the delay difference is a plus value is 1. In other words, the maximum compensatable delay difference in a case where the symbol displacement amount candidate is −1 is 1.

A case where the symbol displacement amount candidate is 0 is the same as a case where the symbol displacement amount candidate is −2. A case where the symbol displacement amount candidate is +1 is the same as a case where the symbol displacement amount candidate is −3. In a case where the symbol displacement amount candidate is +3, there is no error rate less than or equal to 1.1%, in both of a direction where delay differences are plus values and a direction where delay differences are minus values. Accordingly, there is no maximum compensatable delay difference.

Next, the control unit 7 saves, as the symbol displacement amount, a symbol displacement amount candidate where the maximum compensatable delay difference is a maximum (step S6). In a case of, for example, the table 42 illustrated in FIG. 10, the maximum compensatable delay difference is 0 in a case where the symbol displacement amount candidate is −2 or 0, and the maximum compensatable delay difference is 1 in a case where the symbol displacement amount candidate is −1. Accordingly, since the symbol displacement amount candidate where the maximum compensatable delay difference is a maximum is −1, the symbol displacement amount becomes −1.

In the above-mentioned example, the maximum value of the maximum compensatable delay difference is 1. Therefore, if time per one tap of each of the N-tap FIR filters 22 to 25 in the adaptive equalization unit 4 is, for example, 10 ps, it may be estimated that compensation is available even if the inter-polarization delay difference increases by 10 ps from the state of a current transmission path. In addition, if the compensatable inter-polarization delay difference is, for example, 100 ps in total, it may be estimated that, in the state of the current transmission path, the inter-polarization delay difference is about 90 ps.

Next, the control unit 7 sets the number of buffer stages of the first variable delay buffer 2 to "0", and sets the delay amount of the first signal component H_in based on the first variable delay buffer 2 to "0". In addition, the control unit 7 sets the number of buffer stages of the second variable delay buffer 3 to "0", and sets the delay amount of the second signal component V_in based on the second variable delay buffer 3 to "0" (step S7).

Next, by shifting the estimated symbol position by the symbol displacement amount, the control unit 7 obtains a correct symbol position, and sets the correct symbol position as the channel estimation symbol position (step S8). Accordingly, the channel estimation unit 5 is started.

The started channel estimation unit 5 performs channel estimation, based on the correct symbol position, and generates parameter, based on the estimation result thereof. In addition, the channel estimation unit 5 outputs the generated parameters as the initial values of parameters, in other words, the initial values of tap coefficients for the individual N-tap FIR filters 22 to 25 in the adaptive equalization unit 4 (step S9).

The adaptive equalization unit 4 sets, as the tap coefficients for the individual N-tap FIR filters 22 to 25, the initial values of parameters output from the channel estimation unit 5 (step S10). And then, a series of initializing processing operations for the adaptive equalizer 120 (see FIG. 1) finishes.

[Example of Setting of Delay Difference of +1 in First Example of Adaptive Equalizer]

Figure 11:
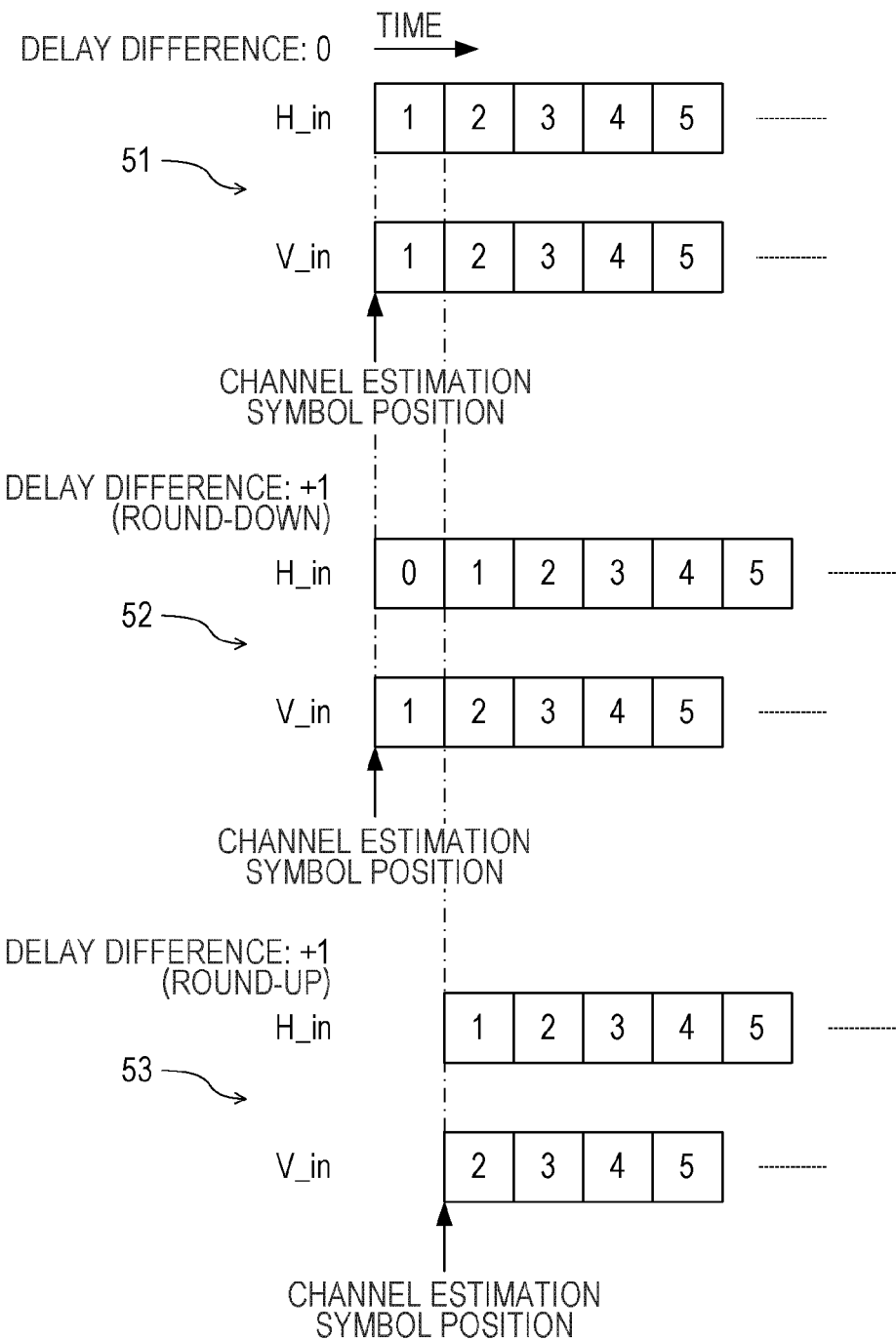
FIG. 11 is a diagram illustrating an example of a setting of a delay difference of +1 in the adaptive equalizer illustrated in FIG. 2.

FIG. 11 is a diagram illustrating an example of a setting of the delay difference of +1 in the adaptive equalizer illustrated in FIG. 2. In a case where the delay difference is 0, as illustrated by a symbol 51 in FIG. 11, both the first signal component H_in and the second signal component V_in are input to the channel estimation unit 5 in such a manner as "12345 . . . ", in a way that assigns sample numbers to the drawing. The channel estimation symbol position is a position corresponding to a sample number 1.

In a case where the delay difference is an odd number, when the control unit 7 sets the channel estimation symbol position in the above-mentioned step S36, there are a case where the absolute value of the value obtained by dividing the current delay difference by 2 is rounded up to the closest whole number and a case where the absolute value is rounded down to the closest whole number. In a description of an example of a setting from this point forward, a case where the absolute value of the value obtained by dividing the current delay difference by 2 is rounded up to the closest whole number is called "round-up" and a case where the absolute value is rounded down to the closest whole number is called "round-down", in some cases.

In a case of the delay difference of +1 and the round-down, as illustrated by a symbol 52, since a delay due to a buffer of one stage is inserted into the first signal component H_in and the channel estimation symbol position is the same as that in a case of the delay difference of 0, the first signal component H_in is input to the channel estimation unit 5 in such a manner as "012345 . . . ". On the other hand, since the second signal component V_in is input to the channel estimation unit 5 in such a manner as "12345 . . . ", the estimated symbol position does not change, and the first signal component H_in is later than the second signal component V_in by the delay difference of 1.

In a case of the round-down, at the channel estimation symbol position, the sample number of the first signal component H_in is "0", and the sample number of the second signal component V_in is "1". Accordingly, in the example of a setting illustrated in FIG. 11, inputting of the first signal component H_in to the channel estimation unit 5 is delayed by one stage.

In a case of the delay difference of +1 and the round-up, as illustrated by a symbol 53, since a delay due to a buffer of one stage is inserted into the first signal component H_in and the channel estimation symbol position is later than that in a case of the delay difference of 0 by one stage, the first signal component H_in is input to the channel estimation unit 5 in such a manner as "12345 . . . ". On the other hand, since the channel estimation symbol position is later than that in a case of the delay difference of 0 by one stage, the second signal component V_in is input to the channel estimation unit 5 in such a manner as "2345 . . . ". Therefore, the estimated symbol position does not change, and the first signal component H_in is later than the second signal component V_in by the delay difference of 1.

In a case of the round-up, at the channel estimation symbol position, the sample number of the first signal component H_in is "1", and the sample number of the second signal component V_in is "2". Accordingly, in the example of a setting illustrated in FIG. 11, inputting of the second signal component Vin to the channel estimation unit 5 is advanced by one stage.

Figure 16:
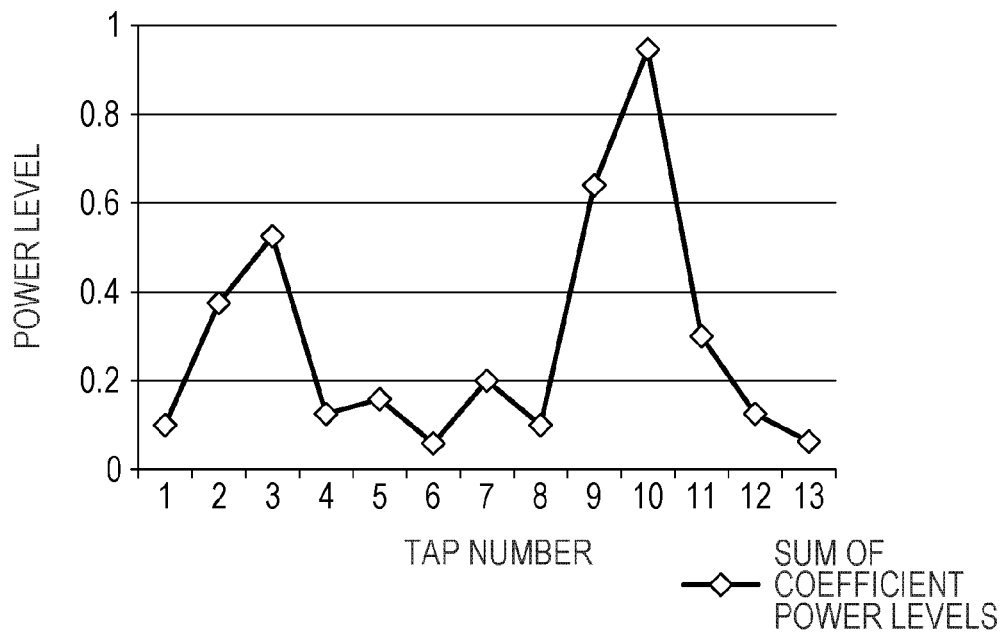
FIG. 16 is a diagram illustrating a sum of power levels of tap coefficients for HH, VH, HV, and VV at the time of the delay difference of 0.
Figure 17:
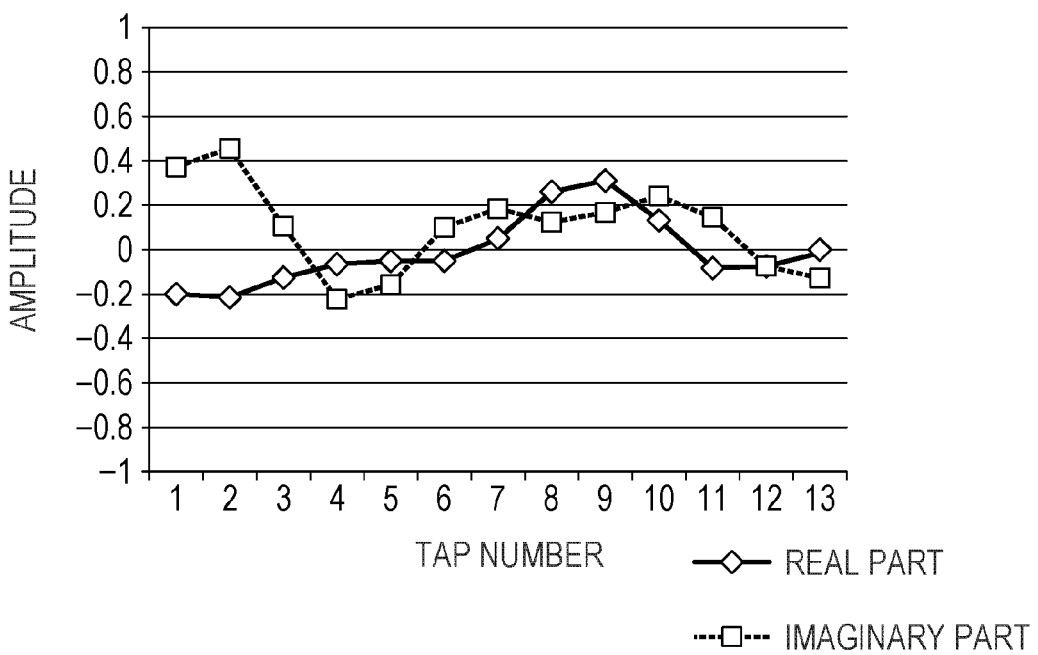
FIG. 17 is a diagram illustrating examples of tap coefficients for the HH N-tap FIR filter at the time of a delay difference of +1.
Figure 18:
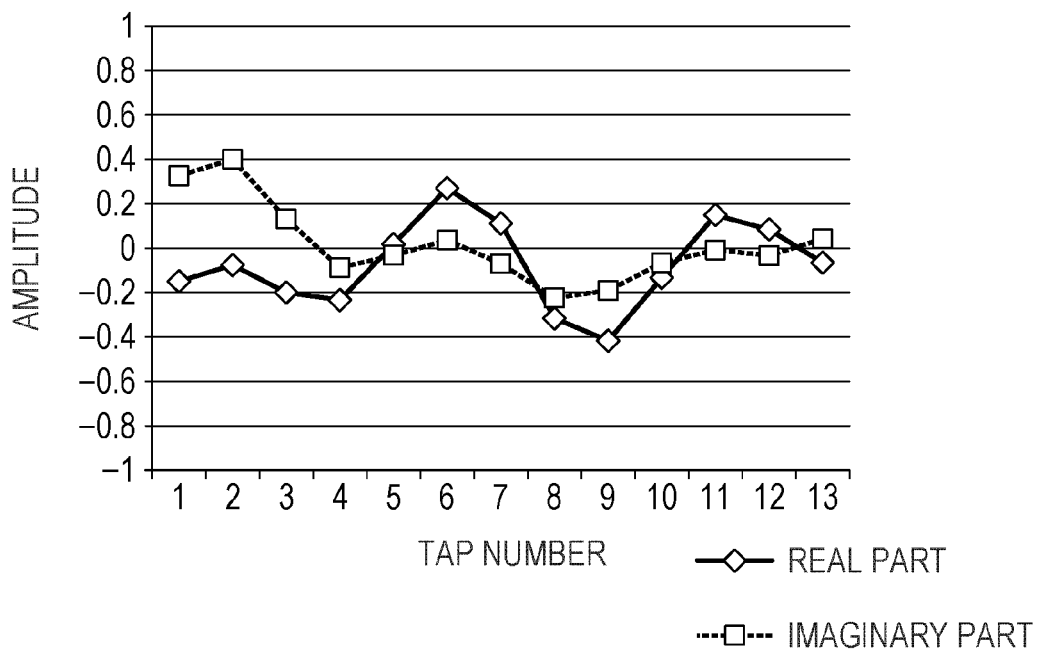
FIG. 18 is a diagram illustrating examples of tap coefficients for the HV N-tap FIR filter at the time of the delay difference of +1.
Figure 19:
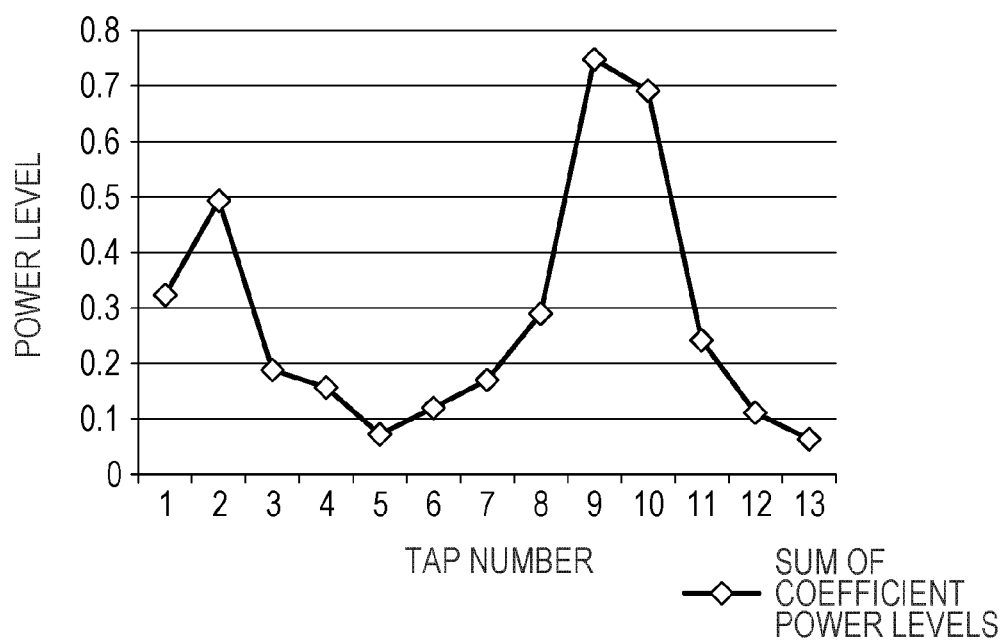
FIG. 19 is a diagram illustrating a sum of power levels of tap coefficients for HH, VH, HV, and VV at the time of the delay difference of +1.

FIG. 12 to FIG. 15 are diagrams illustrating examples of tap coefficients for HH, VH, HV, and VV N-tap FIR filters, respectively, at the time of a delay difference of 0. FIG. 16 is a diagram illustrating the sum of power levels of the tap coefficients for HH, VH, HV, and VV at the time of the delay difference of 0. The power level of a tap coefficient is obtained using the square of the tap coefficient. FIG. 17 and FIG. 18 are diagrams illustrating examples of the tap coefficients for the HH and HV N-tap FIR filters, respectively, at the time of the delay difference of +1. FIG. 19 is a diagram illustrating the sum of power levels of tap coefficients for HH, VH, HV, and VV at the time of the delay difference of +1.

In each of FIG. 12 to FIG. 15, FIG. 17, and FIG. 18, a vertical axis corresponds to the amplitude of a tap coefficient, and a horizontal axis corresponds to a tap number. Since the tap coefficient is expressed by a complex number, the tap coefficient is plotted while being separated into a real part and an imaginary part, in each of FIG. 12 to FIG. 15, FIG. 17, and FIG. 18. In each of FIG. 16 and FIG. 19, a vertical axis corresponds to the square of the amplitude of a tap coefficient, in other words, the power level of the tap coefficient, and a horizontal axis corresponds to a tap number.

Figure 12:
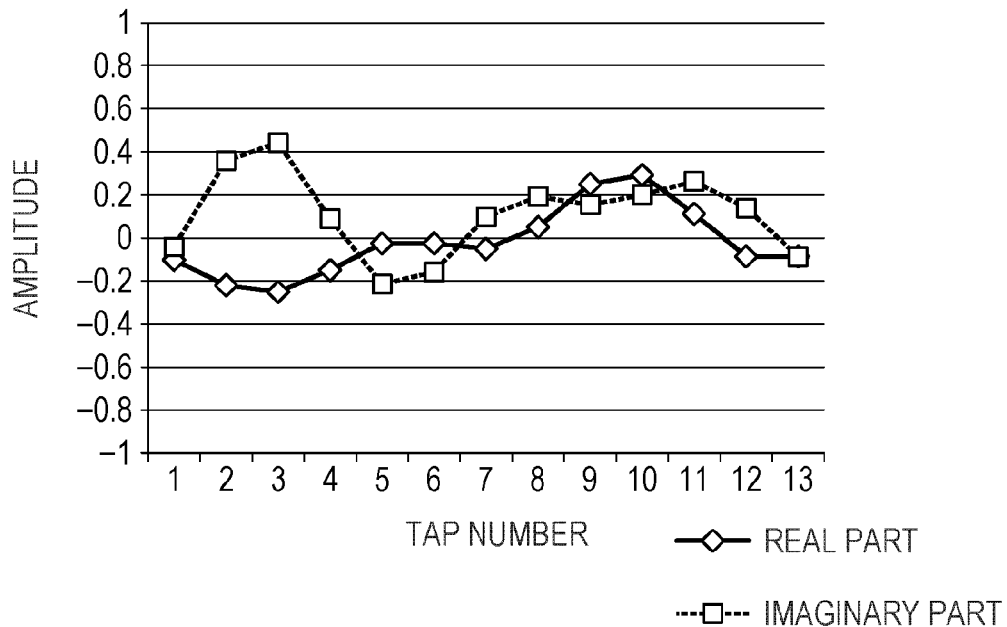
FIG. 12 is a diagram illustrating examples of tap coefficients for an HH N-tap FIR filter at the time of a delay difference of 0.
Figure 13:
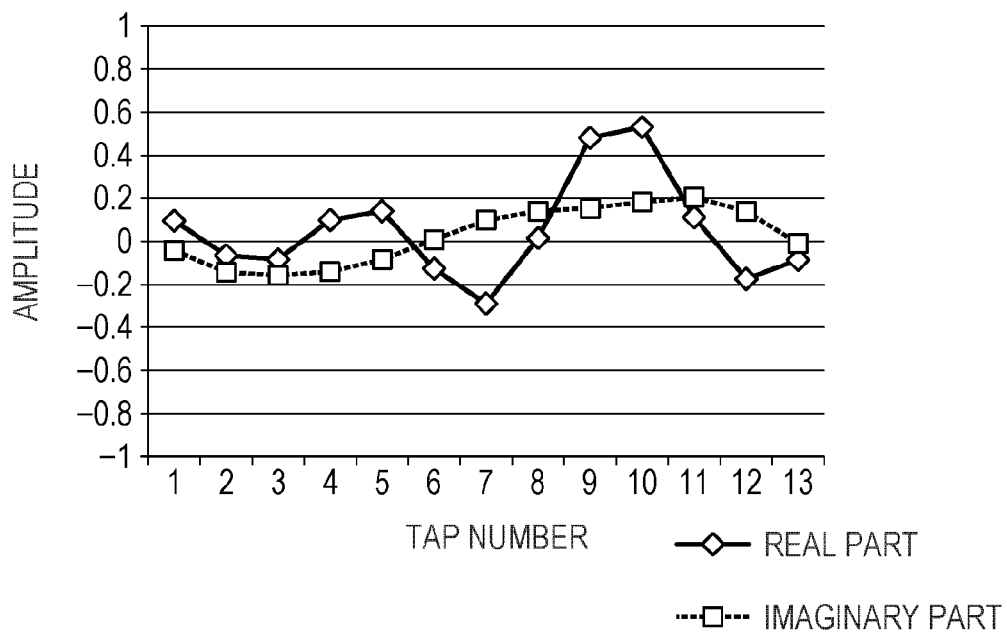
FIG. 13 is a diagram illustrating examples of tap coefficients for a VH N-tap FIR filter at the time of the delay difference of 0.

As is clear from comparison between FIG. 12 and FIG. 17, if a delay due to a buffer of one stage is inserted into the first signal component H_in, tap coefficients for the HH N-tap FIR filter are shifted by one stage in a direction of a smaller tap number. Tap coefficients for the VH N-tap FIR filter in a case where a delay due to a buffer of one stage is inserted into the first signal component H_in are the same as those in FIG. 13. In other words, the tap coefficients for the VH N-tap FIR filter do not change.

In the same way, as is clear from comparison between FIG. 14 and FIG. 18, if a delay due to a buffer of one stage is inserted into the first signal component H_in, tap coefficients for the HV N-tap FIR filter are shifted by one stage in a direction of a smaller tap number. Tap coefficients for the VV N-tap FIR filter in a case where a delay due to a buffer of one stage is inserted into the first signal component H_in are the same as those in FIG. 15. In other words, the tap coefficients for the VV N-tap FIR filter do not change.

[Example of Setting of Delay Difference of +2 in First Example of Adaptive Equalizer]

Figure 20:
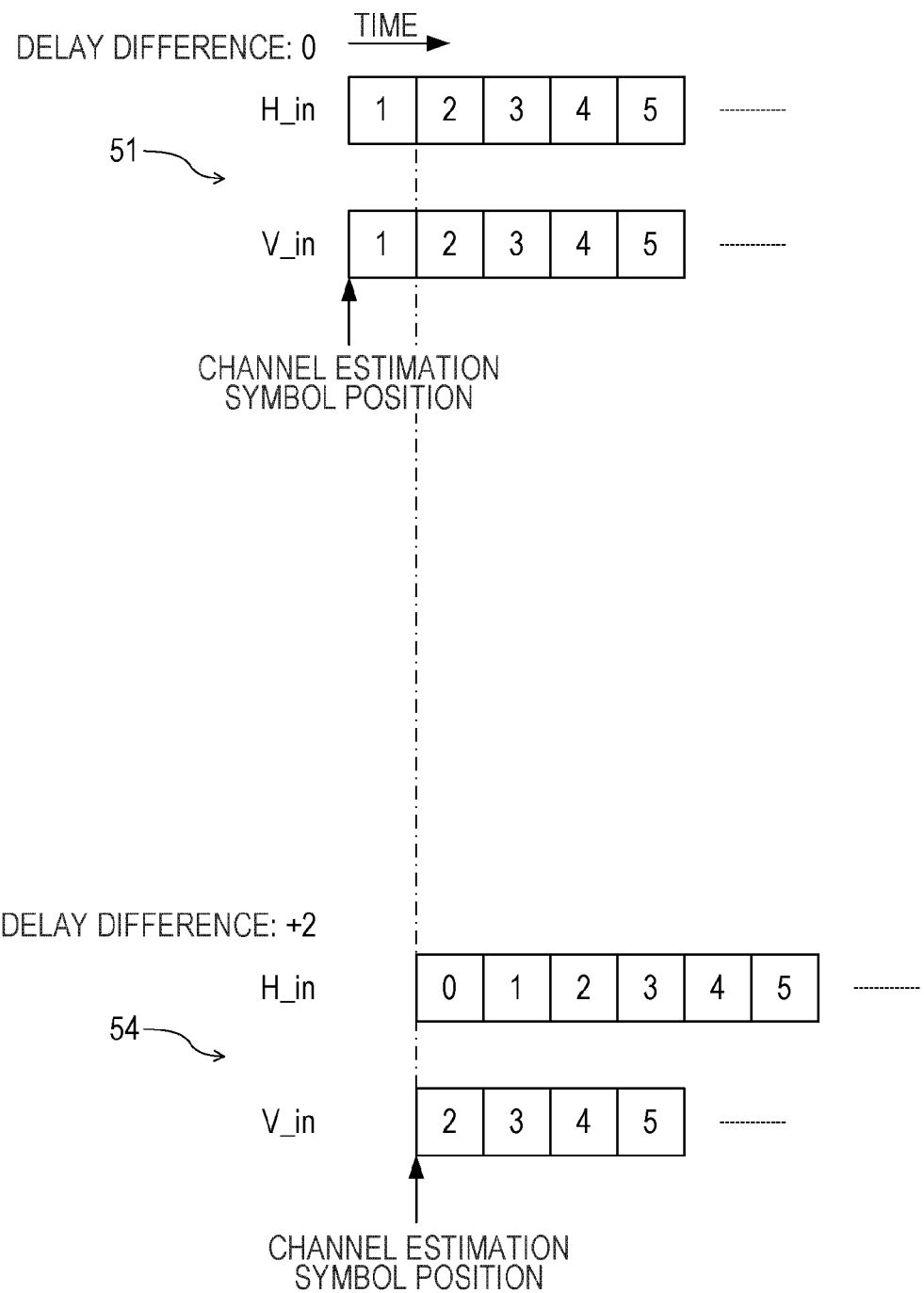
FIG. 20 is a diagram illustrating an example of a setting of a delay difference of +2 in the adaptive equalizer illustrated in FIG. 2.

FIG. 20 is a diagram illustrating an example of a setting of the delay difference of +2 in the adaptive equalizer illustrated in FIG. 2. In a case where the delay difference is +2, as illustrated by a symbol 54, a delay due to buffers of two stages is inserted into the first signal component H_in, and the channel estimation symbol position is later than that in a case of the delay difference of 0 by one stage. Therefore, the first signal component H_in is input to the channel estimation unit 5 in such a manner as "012345 . . . ". On the other hand, since the channel estimation symbol position is later than that in a case of the delay difference of 0 by one stage, the second signal component V_in is input to the channel estimation unit 5 in such a manner as "2345 . . . ". Therefore, the estimated symbol position does not change, and the first signal component H_in is later than the second signal component V_in by the delay difference of 2.

At the channel estimation symbol position, the sample number of the first signal component H_in is "0", and the sample number of the second signal component V_in is "2". Accordingly, in the example of a setting illustrated in FIG. 20, inputting of the first signal component H_in to the channel estimation unit 5 is delayed by one stage, and inputting of the second signal component V_in to the channel estimation unit 5 is advanced by one stage.

[Example of Setting of Delay Difference of +3 in First Example of Adaptive Equalizer]

Figure 21:
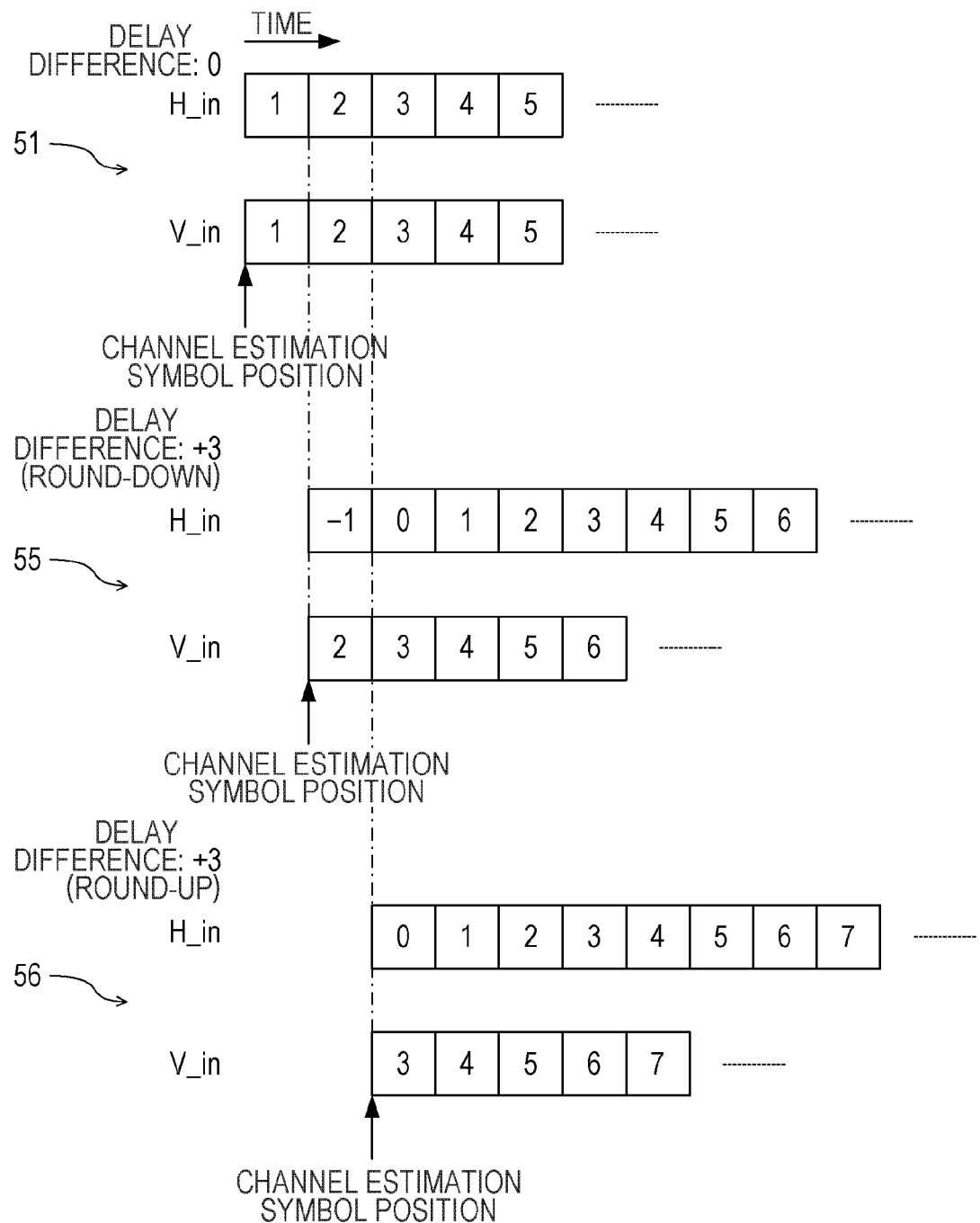
FIG. 21 is a diagram illustrating an example of a setting of a delay difference of +3 in the adaptive equalizer illustrated in FIG. 2.

FIG. 21 is a diagram illustrating an example of a setting of the delay difference of +3 in the adaptive equalizer illustrated in FIG. 2. In a case of the delay difference of +3 and the round-down, as illustrated by a symbol 55, since a delay due to buffers of three stages is inserted into the first signal component H_in and the channel estimation symbol position is later than that in a case of the delay difference of 0 by one stage, the first signal component H_in is input to the channel estimation unit 5 in such a manner as "−10123456 . . . ". On the other hand, since the channel estimation symbol position is later than that in a case of the delay difference of 0 by one stage, the second signal component V_in is input to the channel estimation unit 5 in such a manner as "23456 . . . ". Therefore, the estimated symbol position does not change, and the first signal component H_in is later than the second signal component V_in by the delay difference of 3.

In a case of the round-down, at the channel estimation symbol position, the sample number of the first signal component H_in is −1, and the sample number of the second signal component V_in is 2. Accordingly, in the example of a setting illustrated in FIG. 21, inputting of the first signal component H_in to the channel estimation unit 5 is delayed by two stages, and inputting of the second signal component V_in to the channel estimation unit 5 is advanced by one stage.

In a case of the delay difference of +3 and the round-up, as illustrated by a symbol 56, since a delay due to buffers of three stages is inserted into the first signal component H_in and the channel estimation symbol position is later than that in a case of the delay difference of 0 by two stages, the first signal component H_in is input to the channel estimation unit 5 in such a manner as "01234567 . . . ". On the other hand, since the channel estimation symbol position is later than that in a case of the delay difference of 0 by two stages, the second signal component V_in is input to the channel estimation unit 5 in such a manner as "34567 . . . ". Therefore, the estimated symbol position does not change, and the first signal component H_in is later than the second signal component V_in by the delay difference of 3.

In a case of the round-up, at the channel estimation symbol position, the sample number of the first signal component H_in is "0", and the sample number of the second signal component V_in is "3". Accordingly, in the example of a setting illustrated in FIG. 21, inputting of the first signal component H_in to the channel estimation unit 5 is delayed by one stage, and inputting of the second signal component V_in to the channel estimation unit 5 is advanced by two stages.

[Example of Setting of Delay Difference of +4 in First Example of Adaptive Equalizer]

Figure 22:
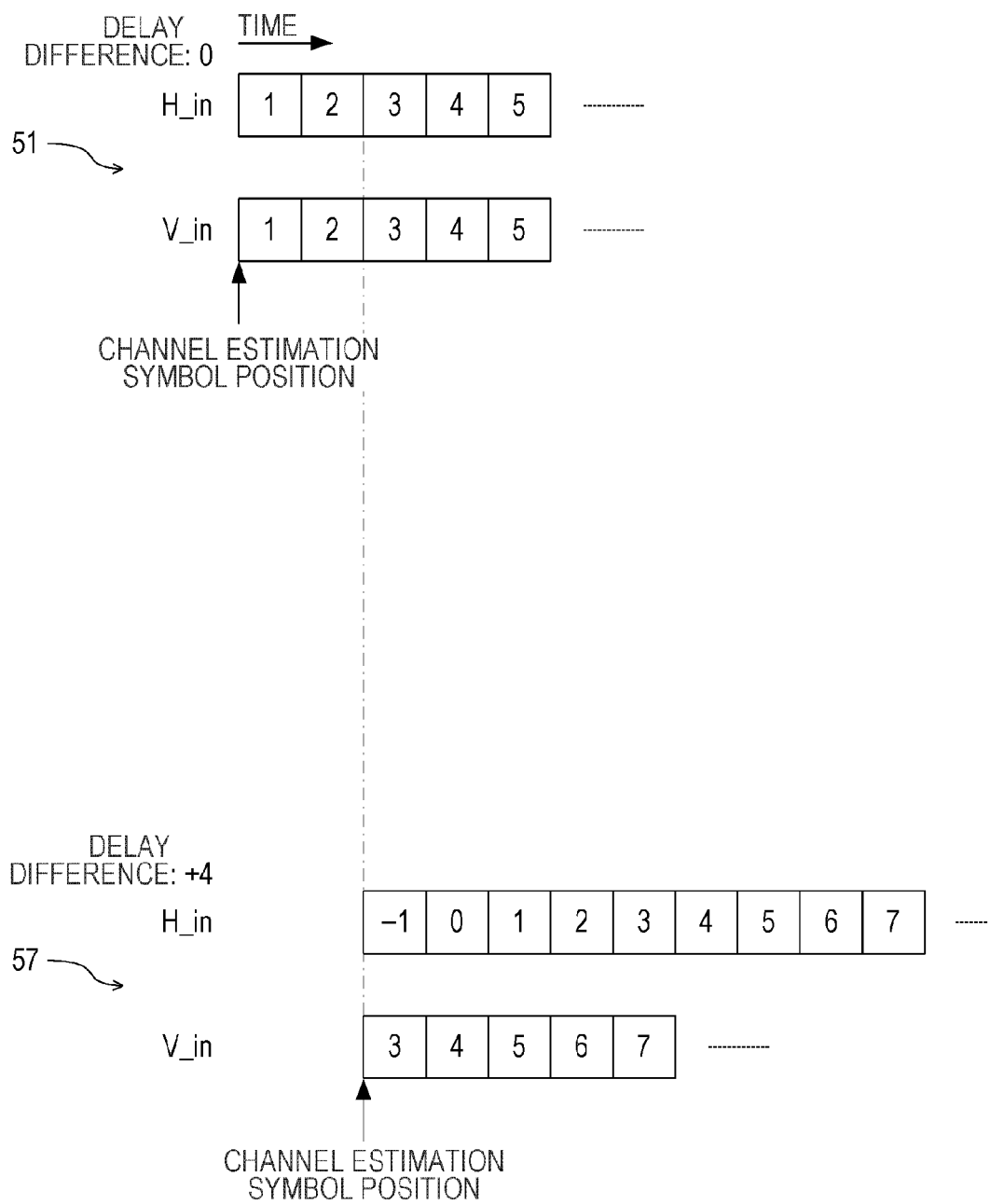
FIG. 22 is a diagram illustrating an example of a setting of a delay difference of +4 in the adaptive equalizer illustrated in FIG. 2.

FIG. 22 is a diagram illustrating an example of a setting of the delay difference of +4 in the adaptive equalizer illustrated in FIG. 2. In a case where the delay difference is +4, as illustrated by a symbol 57, a delay due to buffers of four stages is inserted into the first signal component H_in, and the channel estimation symbol position is later than that in a case of the delay difference of 0 by two stages. Therefore, the first signal component H_in is input to the channel estimation unit 5 in such a manner as "−101234567 . . . ". On the other hand, since the channel estimation symbol position is later than that in a case of the delay difference of 0 by two stages, the second signal component V_in is input to the channel estimation unit 5 in such a manner as "34567 . . . ". Therefore, the estimated symbol position does not change, and the first signal component H_in is later than the second signal component V_in by the delay difference of 4.

At the channel estimation symbol position, the sample number of the first signal component H_in is −1, and the sample number of the second signal component V_in is 3. Accordingly, in the example of a setting illustrated in FIG. 22, inputting of the first signal component H_in to the channel estimation unit 5 is delayed by two stages, and inputting of the second signal component V_in to the channel estimation unit 5 is advanced by two stages.

[Example of Setting of Delay Difference of −1 in First Example of Adaptive Equalizer]

Figure 23:
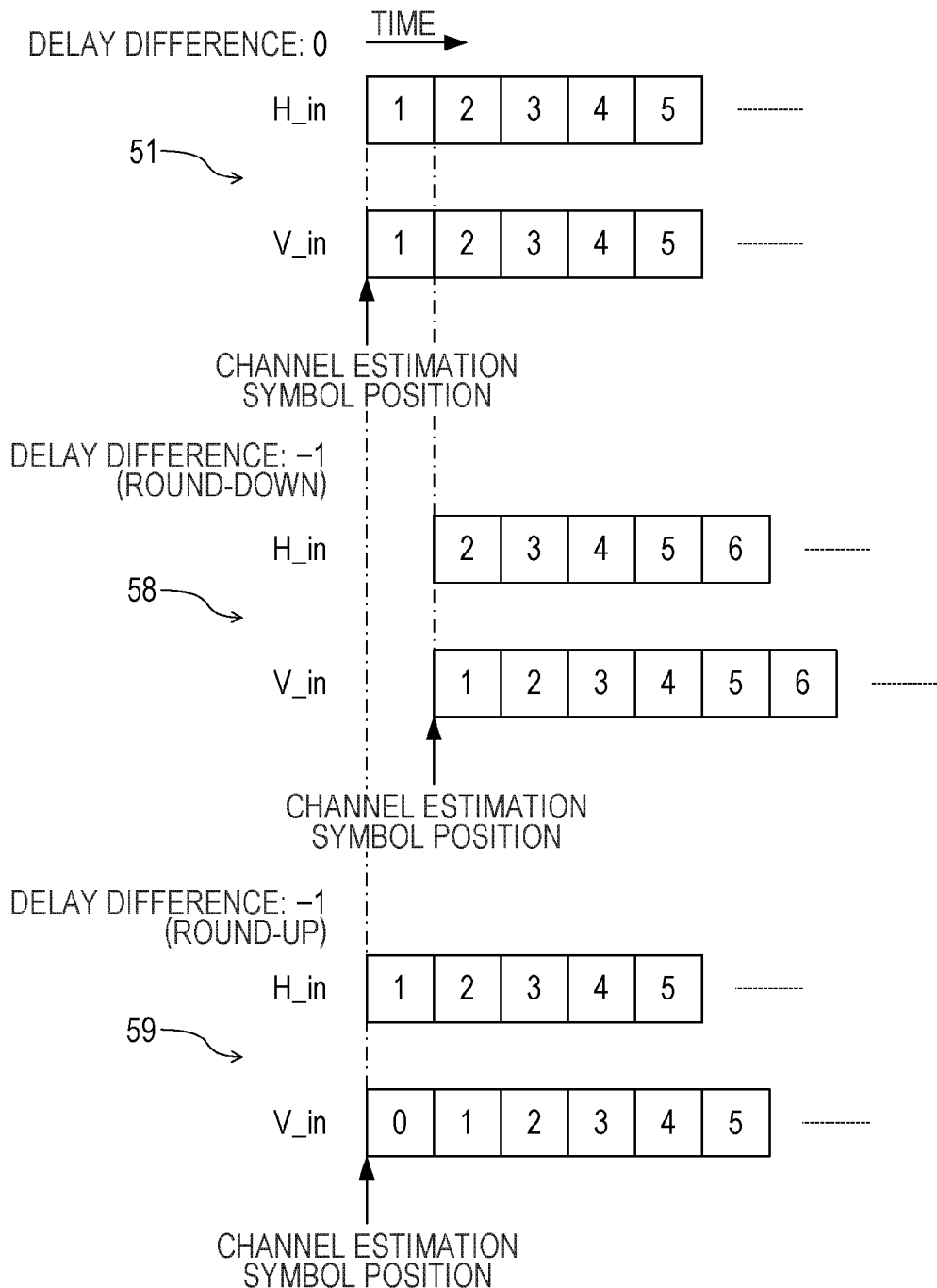
FIG. 23 is a diagram illustrating an example of a setting of a delay difference of −1 in the adaptive equalizer illustrated in FIG. 2.

FIG. 23 is a diagram illustrating an example of a setting of the delay difference of −1 in the adaptive equalizer illustrated in FIG. 2. In a case of the delay difference of −1 and the round-down, as illustrated by a symbol 58, since a delay due to a buffer of one stage is inserted into the second signal component V_in and the channel estimation symbol position is later than that in a case of the delay difference of 0 by one stage, the second signal component V_in is input to the channel estimation unit 5 in such a manner as "123456 . . . ". On the other hand, since the channel estimation symbol position is later than that in a case of the delay difference of 0 by one stage, the first signal component H_in is input to the channel estimation unit 5 in such a manner as "23456 . . . ". Therefore, the estimated symbol position does not change, and the second signal component V_in is later than the first signal component H_in by the delay difference of 1.

In a case of the round-down, at the channel estimation symbol position, the sample number of the first signal component H_in is "2", and the sample number of the second signal component V_in is "1". Accordingly, in the example of a setting illustrated in FIG. 23, inputting of the first signal component H_in to the channel estimation unit 5 is advanced by one stage.

In a case of the delay difference of −1 and the round-up, as illustrated by a symbol 59, since a delay due to a buffer of one stage is inserted into the second signal component V_in and the channel estimation symbol position is the same as that in a case of the delay difference of 0, the second signal component V_in is input to the channel estimation unit 5 in such a manner as "012345 . . . ". On the other hand, since the channel estimation symbol position is the same as that in a case of the delay difference of 0, the first signal component H_in is input to the channel estimation unit 5 in such a manner as "12345 . . . ". Therefore, the estimated symbol position does not change, and the second signal component V_in is later than the first signal component H_in by the delay difference of 1.

In a case of the round-up, at the channel estimation symbol position, the sample number of the first signal component H_in is "1", and the sample number of the second signal component V_in is "0". Accordingly, in the example of a setting illustrated in FIG. 23, inputting of the second signal component V_in to the channel estimation unit 5 is delayed by one stage.

[Example of Setting of Delay Difference of −2 in First Example of Adaptive Equalizer]

Figure 24:
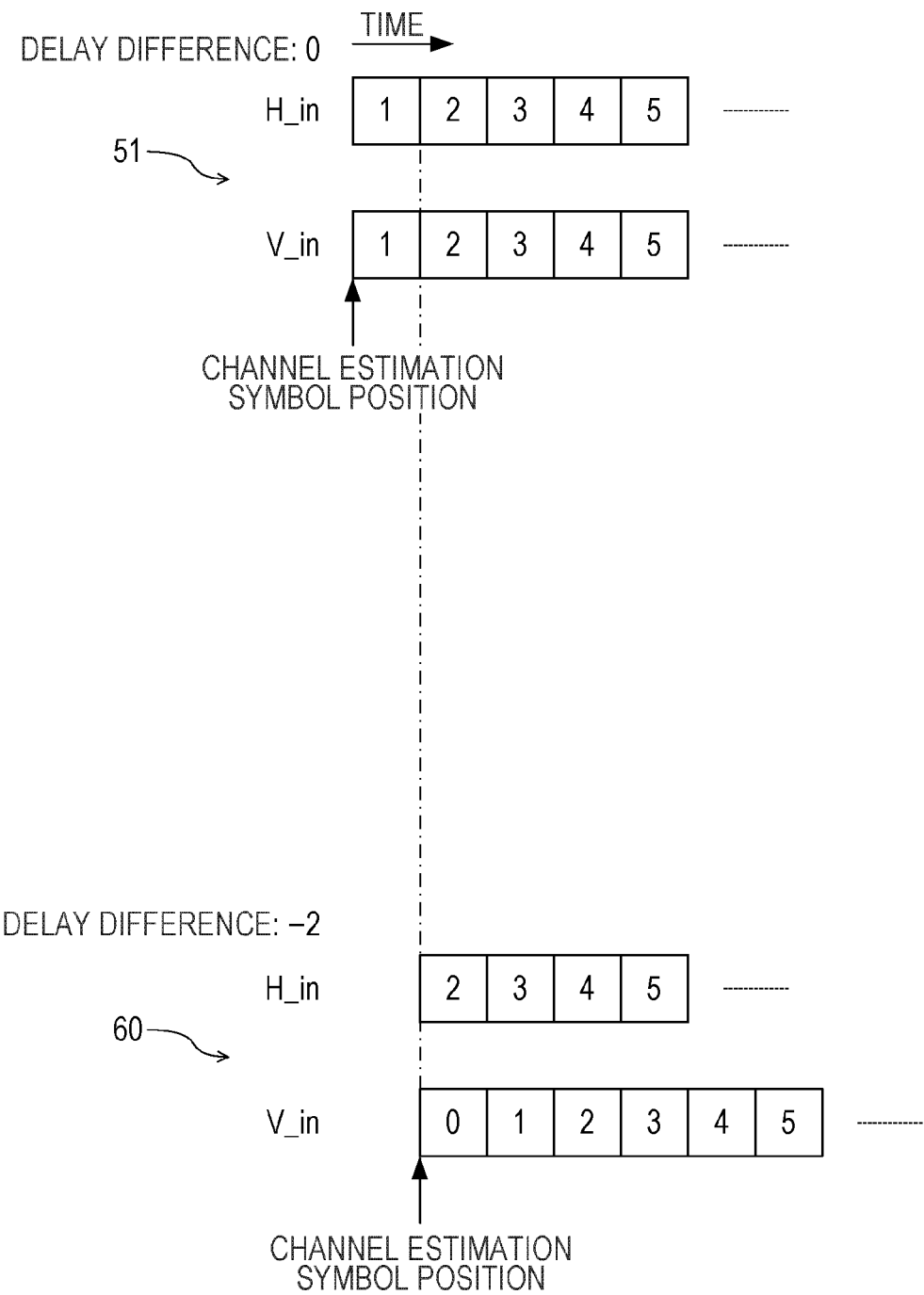
FIG. 24 is a diagram illustrating an example of a setting of a delay difference of −2 in the adaptive equalizer illustrated in FIG. 2.

FIG. 24 is a diagram illustrating an example of a setting of the delay difference of −2 in the adaptive equalizer illustrated in FIG. 2. In a case of the delay difference of −2, as illustrated by a symbol 60, since a delay due to buffers of two stages is inserted into the second signal component V_in and the channel estimation symbol position is later than that in a case of the delay difference of 0 by one stage, the second signal component V_in is input to the channel estimation unit 5 in such a manner as "012345 . . . ". On the other hand, since the channel estimation symbol position is later than that in a case of the delay difference of 0 by one stage, the first signal component H_in is input to the channel estimation unit 5 in such a manner as "2345 . . . ". Therefore, the estimated symbol position does not change, and the second signal component V_in is later than the first signal component H_in by the delay difference of 2.

At the channel estimation symbol position, the sample number of the first signal component H_in is "2", and the sample number of the second signal component V_in is "0". Accordingly, in the example of a setting illustrated in FIG. 24, inputting of the first signal component H_in to the channel estimation unit 5 is advanced by one stage, and inputting of the second signal component V_in to the channel estimation unit 5 is delayed by one stage.

[Example of Setting of Delay Difference of −3 in First Example of Adaptive Equalizer]

Figure 25:
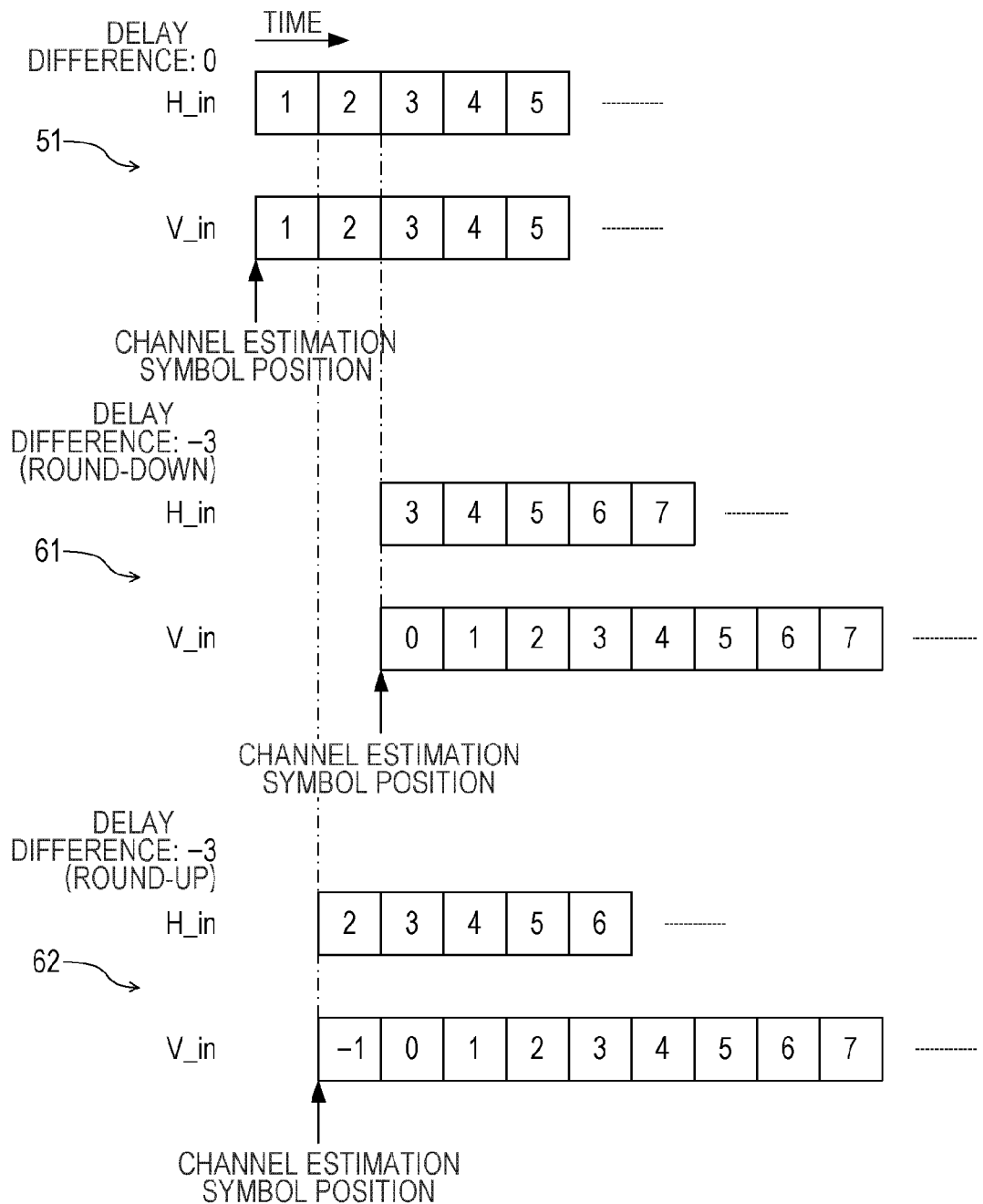
FIG. 25 is a diagram illustrating an example of a setting of a delay difference of −3 in the adaptive equalizer illustrated in FIG. 2.

FIG. 25 is a diagram illustrating an example of a setting of the delay difference of −3 in the adaptive equalizer illustrated in FIG. 2. In a case of the delay difference of −3 and the round-down, as illustrated by a symbol 61, since a delay due to buffers of three stages is inserted into the second signal component V_in and the channel estimation symbol position is later than that in a case of the delay difference of 0 by two stages, the second signal component V_in is input to the channel estimation unit 5 in such a manner as "01234567 . . . ". On the other hand, since the channel estimation symbol position is later than that in a case of the delay difference of 0 by two stages, the first signal component H_in is input to the channel estimation unit 5 in such a manner as "34567 . . . ". Therefore, the estimated symbol position does not change, and the second signal component V_in is later than the first signal component H_in by the delay difference of 3.

In a case of the round-down, at the channel estimation symbol position, the sample number of the first signal component H_in is "3", and the sample number of the second signal component V_in is "0". Accordingly, in the example of a setting illustrated in FIG. 25, inputting of the first signal component H_in to the channel estimation unit 5 is advanced by two stages, and inputting of the second signal component V_in to the channel estimation unit 5 is delayed by one stage.

In a case of the delay difference of −3 and the round-up, as illustrated by a symbol 62, since a delay due to buffers of three stages is inserted into the second signal component V_in and the channel estimation symbol position is later than that in a case of the delay difference of 0 by one stage, the second signal component V_in is input to the channel estimation unit 5 in such a manner as "−101234567 . . . ". On the other hand, since the channel estimation symbol position is later than that in a case of the delay difference of 0 by one stage, the first signal component H_in is input to the channel estimation unit 5 in such a manner as "23456 . . . ". Therefore, the estimated symbol position does not change, and the second signal component V_in is later than the first signal component H_in by the delay difference of 3.

In a case of the round-up, at the channel estimation symbol position, the sample number of the first signal component H_in is 2, and the sample number of the second signal component V_in is −1. Accordingly, in the example of a setting illustrated in FIG. 25, inputting of the first signal component H_in to the channel estimation unit 5 is advanced by one stage, and inputting of the second signal component V_in to the channel estimation unit 5 is delayed by two stages.

According to the optical receiving device including the adaptive equalizer 120 illustrated in FIG. 2, the final channel estimation symbol position and the parameters of the adaptive equalization unit 4 are generated so that the error rate is less than or equal to the reference value and a delay difference provided between the two signal components H_in and V_in of the reception TS becomes as large as possible. Accordingly, since calculation of the weighted center of a filtering shape determined by the tap coefficients is avoided, it is possible to obtain the final channel estimation symbol position and the parameters of the adaptive equalization unit 4 without influence of a difference in loss between polarized waves. In other words, since it becomes possible to obtain the parameters of the adaptive equalizer, which are capable of adapting to a disturbance at the time of communication, it is possible to further improve the reception performance.

In addition, according to the optical receiving device including the adaptive equalizer 120 illustrated in FIG. 2, the number of buffer stages of each of the first buffer 2 and the second buffer 3 and the channel estimation symbol position are set in accordance with the current delay difference. Accordingly, it is possible to realize a setting in which one of the two signal components H_in and V_in of the reception TS symbol is advanced and the other is delayed.

In addition, according to the optical receiving device including the adaptive equalizer 120 illustrated in FIG. 2, a smaller one of a maximum delay difference in a case where the first signal component H_in is later than the second signal component V_in and a maximum delay difference in a case where the second signal component V_in is later than the first signal component H_in is set as the maximum compensatable delay difference with respect to each symbol displacement amount candidate. In addition, a symbol displacement amount candidate where the maximum compensatable delay difference is a maximum is set as the symbol displacement amount for the estimated symbol position. Therefore, at the time of obtaining the correct symbol position, it is possible to avoid discarding of some of tap coefficients having weights.

In addition, according to the optical receiving device including the adaptive equalizer 120 illustrated in FIG. 2, since a delay difference is set based on the number of tap stages of the FIR filter included in the adaptive equalization unit 4, it is possible to avoid a state in which a delay difference in a range actually difficult for the FIR filter in the adaptive equalization unit 4 to compensate is set. Accordingly, it is possible to avoid more than enough time taken for the initializing processing for the adaptive equalizer 120.

In addition, according to the optical receiving device including the adaptive equalizer 120 illustrated in FIG. 2, even if a delay difference between the two signal components H_in and V_in of the reception TS symbol is large, parameters suitable for reception with a low error rate are obtained. Therefore, even if an inter-polarization delay difference or a difference in loss between polarized waves is large, it is possible to perform high-speed transmission. In addition, it is possible to perform long-distance transmission in which the inter-polarization delay difference or a difference in loss between polarized waves increases. In addition, since the number of taps of the FIR filter in the adaptive equalization unit 4 is not increased excessively, it is possible to reduce the number of taps.

In addition, in the adaptive equalizer 120 illustrated in FIG. 2, the control unit 7 may output the maximum value of a maximum compensatable delay difference or a value obtained by subtracting the maximum value of a maximum compensatable delay difference from the value of a compensatable inter-polarization delay difference. By doing so, it is possible to estimate a more compensatable inter-polarization delay difference from the state of the current transmission path, or estimate the state of the inter-polarization delay difference in the current transmission path.

[Second Example of Adaptive Equalizer]

Figure 26:
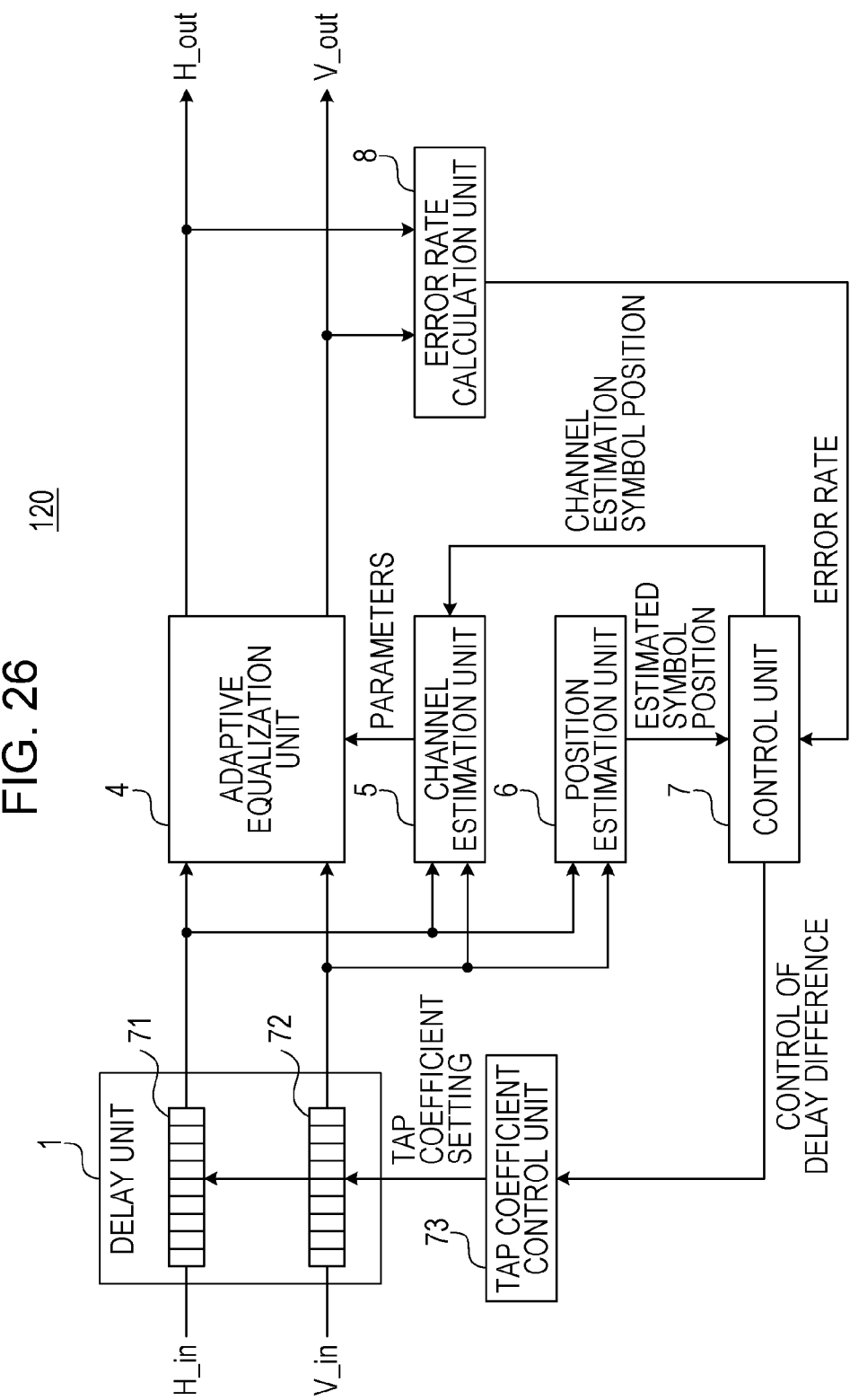
FIG. 26 is a diagram illustrating a second example of the adaptive equalizer in the optical receiving device according to the embodiment.

FIG. 26 is a diagram illustrating a second example of the adaptive equalizer in the optical receiving device according to the embodiment. In FIG. 26, arrows indicate the flow of a signal. An adaptive equalizer 120 illustrated in FIG. 26 is an example of the adaptive equalizer in the optical receiving device illustrated in FIG. 1. As illustrated in FIG. 26, the second example of the adaptive equalizer includes a first fixed FIR filter 71 and a second fixed FIR filter 72 in the delay unit 1, and, for example, a tap coefficient control unit 73.

There is a digital coherent receiver in which fixed FIR filters whose tap coefficients are not adaptively controlled are provided in front of an adaptive equalizer and the analog characteristic of the receiver is compensated. In a case where the optical receiving device 100 illustrated in, for example, FIG. 1 is such a digital coherent receiver, the first fixed FIR filter 71 and the second fixed FIR filter 72 may be used in place of the first variable delay buffer 2 and the second variable delay buffer 3, respectively, in the first example of the adaptive equalizer illustrated in FIG. 2, in the delay unit 1.

In other words, by controlling the tap coefficients of each of the first fixed FIR filter 71 and the second fixed FIR filter 72, such a delay difference as described in the first example of the adaptive equalizer may be provided between the first signal component H_in and the second signal component V_in.

The first signal component H_in is input to the first fixed FIR filter 71. The second signal component V_in is input to the second fixed FIR filter 72. The first fixed FIR filter 71 and the second fixed FIR filter 72 are connected to, for example, the tap coefficient control unit 73, and the tap coefficients of each of the first fixed FIR filter 71 and the second fixed FIR filter 72 are controlled by the tap coefficient control unit 73.

The tap coefficient control unit 73 is connected to, for example, the control unit 7. The tap coefficient control unit 73 changes the tap coefficients of the first fixed FIR filter 71, and sets the changed tap coefficients in the first fixed FIR filter 71. The tap coefficient control unit 73 changes the tap coefficients of the second fixed FIR filter 72, and sets the changed tap coefficients in the second fixed FIR filter 72.

Based on the delay difference provided between the first signal component H_in and the second signal component V_in, the control unit 7 controls changing of the tap coefficients of the first fixed FIR filter 71 or the second fixed FIR filter 72 by the tap coefficient control unit 73.

In the second example illustrated in FIG. 26, it is assumed that a case where the first signal component H_in that passes through the first fixed FIR filter 71 is later than the second signal component V_in that passes through the second fixed FIR filter 72 corresponds to a plus delay difference. In addition, it is assumed that a case where the second signal component V_in that passes through the second fixed FIR filter 72 is later than the first signal component H_in that passes through the first fixed FIR filter 71 corresponds to a minus delay difference.

The first fixed FIR filter 71 and the second fixed FIR filter 72 may be each realized using hardware. The tap coefficient control unit 73 may be realized using hardware or may be realized using software. A hardware configuration in a case where the tap coefficient control unit 73 is realized using software is as illustrated in, for example, FIG. 5. In addition, the tap coefficient control unit 73 and the control unit 7 may be put together into one control unit.

Figure 27:
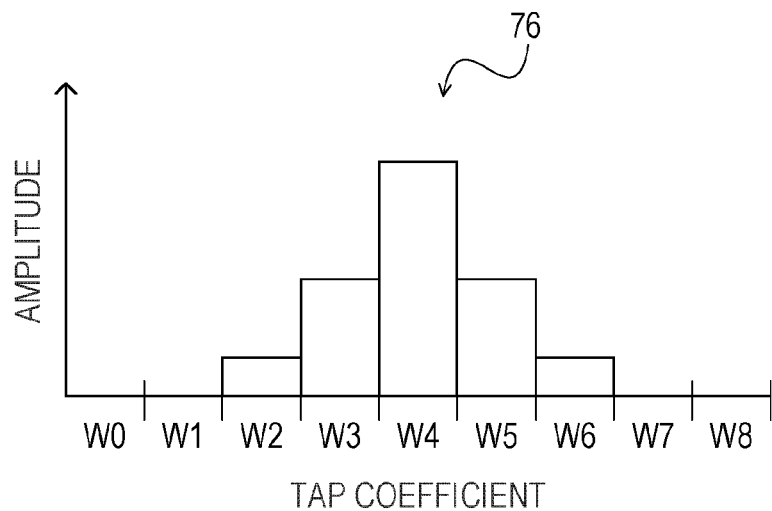
FIG. 27 is a diagram illustrating examples of tap coefficients at normal time of a fixed FIR filter.
Figure 28:
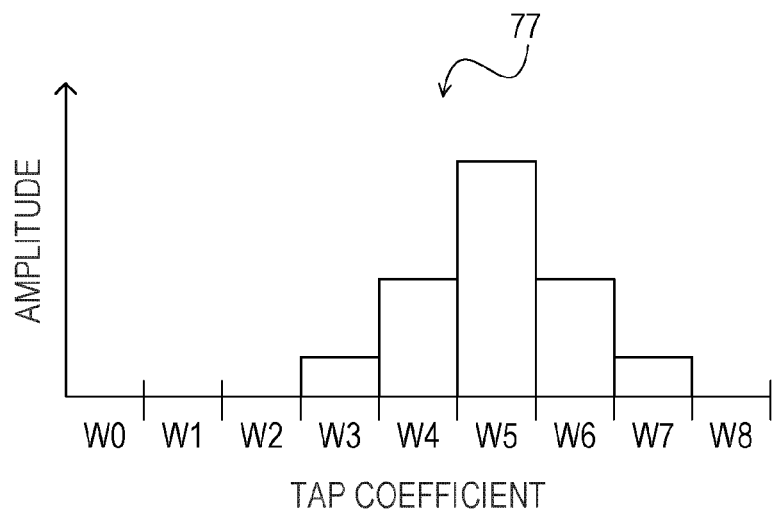
FIG. 28 is a diagram illustrating tap coefficients in a case where the tap coefficients illustrated in FIG. 27 are shifted by one stage.

FIG. 27 is a diagram illustrating examples of tap coefficients at normal time of a fixed FIR filter. FIG. 28 is a diagram illustrating tap coefficients in a case where the tap coefficients illustrated in FIG. 27 are shifted by one stage. If tap coefficients 76 at normal time illustrated in FIG. 27 are shifted in a direction of a larger tap number, the tap coefficients 76 become equal to those in a case where one-stage delay is inserted in such a way as shifted tap coefficients 77 illustrated in FIG. 28. Accordingly, by shifting the tap coefficients of the first fixed FIR filter 71 or the second fixed FIR filter 72 in such a manner as by one stage, two stages, three stages, . . . , it is possible to perform the same control as that in the first example of the adaptive equalizer illustrated in FIG. 2. Since other configurations and the contents of other processing operations are the same as those in the above-mentioned first example of the adaptive equalizer, the redundant descriptions thereof will be omitted.

According to the optical receiving device including the adaptive equalizer 120 illustrated in FIG. 26, in the same way as the optical receiving device including the adaptive equalizer 120 illustrated in FIG. 2, it becomes possible to obtain the parameters of the adaptive equalizer, which are capable of adapting to a disturbance at the time of communication. Therefore, it is possible to further improve the reception performance. In addition, according to the optical receiving device including the adaptive equalizer 120 illustrated in FIG. 26, an advantageous effect that it is allowed not to change hardware or an advantageous effect that the size of hardware does not become larger is achieved.

[Third Example of Adaptive Equalizer]

Figure 29:
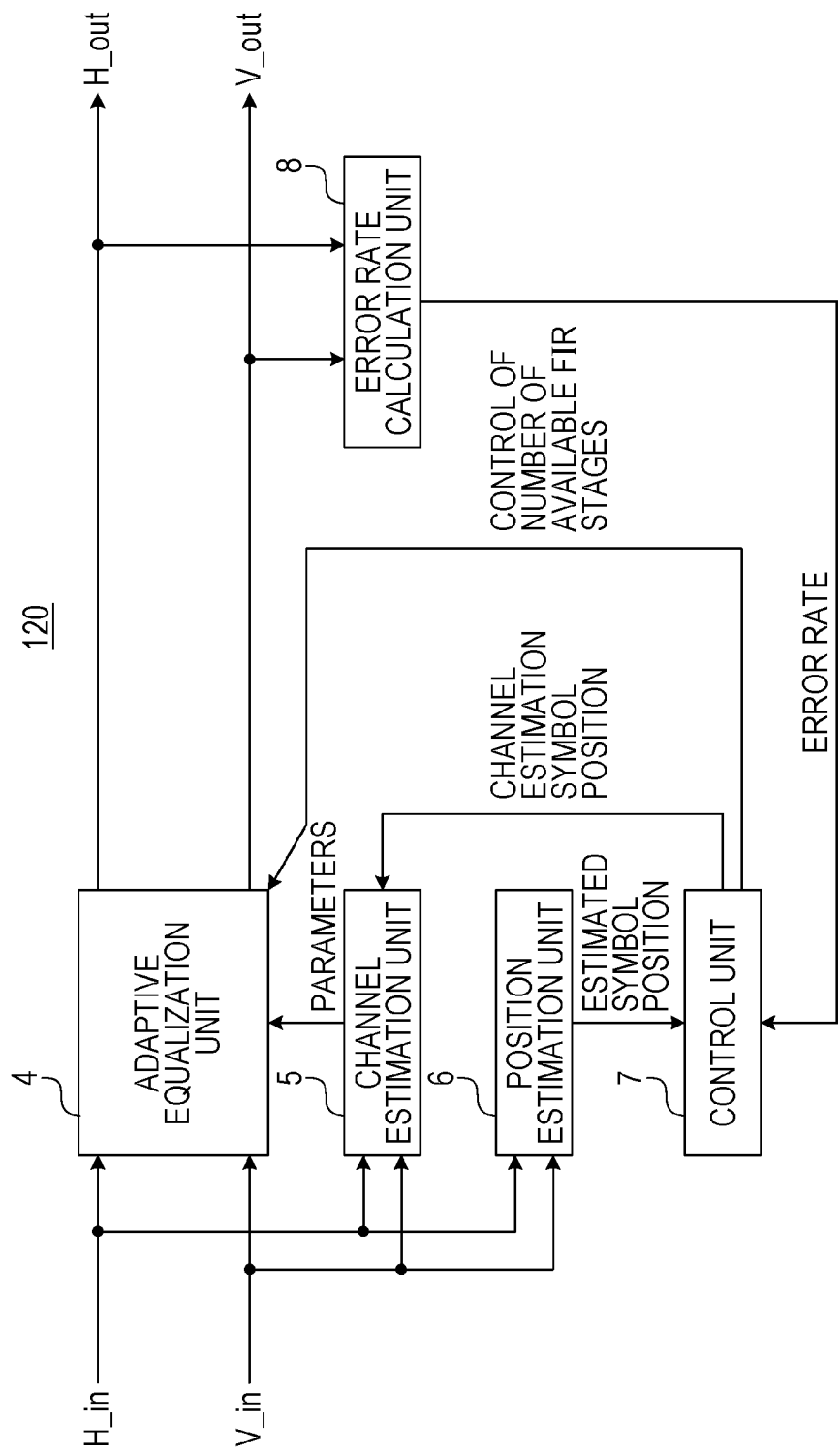
FIG. 29 is a diagram illustrating a third example of the adaptive equalizer in the optical receiving device according to the embodiment.

FIG. 29 is a diagram illustrating a third example of the adaptive equalizer in the optical receiving device according to the embodiment. In FIG. 29, arrows indicate the flow of a signal. An adaptive equalizer 120 illustrated in FIG. 29 is an example of the adaptive equalizer in the optical receiving device illustrated in FIG. 1. As illustrated in FIG. 29, in the third example of the adaptive equalizer, the FIR filter included in the adaptive equalization unit 4 is used in place of the delay unit 1 in the first example of the adaptive equalizer illustrated in the FIG. 2.

In other words, by controlling the tap coefficients of each of the N-tap FIR filters 22 to 25 used for HH, VH, HV, and VV in the adaptive equalization unit 4 illustrated in FIG. 4, the same state as a state in which such a delay difference as described in the first example of the adaptive equalizer is provided between the first signal component H_in and the second signal component V_in may be realized.

The first signal component H_in and the second signal component V_in are input to the channel estimation unit 5. Based on the channel estimation symbol position generated by the control unit 7, the channel estimation unit 5 performs channel estimation using the first signal component H_in and the second signal component V_in.

The first signal component H_in and the second signal component V_in are input to the adaptive equalization unit 4. The adaptive equalization unit 4 is connected to the control unit 7, and the setting of the tap coefficients thereof is controlled by the control unit 7. The control unit 7 controls the number of available FIR stages of each of the N-tap FIR filters 22 to 25 of the adaptive equalization unit 4. In taps set as available in each of the N-tap FIR filters 22 to 25 by the control unit 7, tap coefficients generated by the channel estimation unit 5 are set while being shifted by an amount corresponding to taps set as unavailable by the control unit 7. The tap coefficients of the taps set as unavailable are fixed to "0".

In the third example illustrated in FIG. 29, a case where the first signal component H_in is later than the second signal component V_in corresponds to a plus delay difference. In addition, a case where the second signal component V_in is later than the first signal component H_in corresponds to a minus delay difference.

Figure 30:
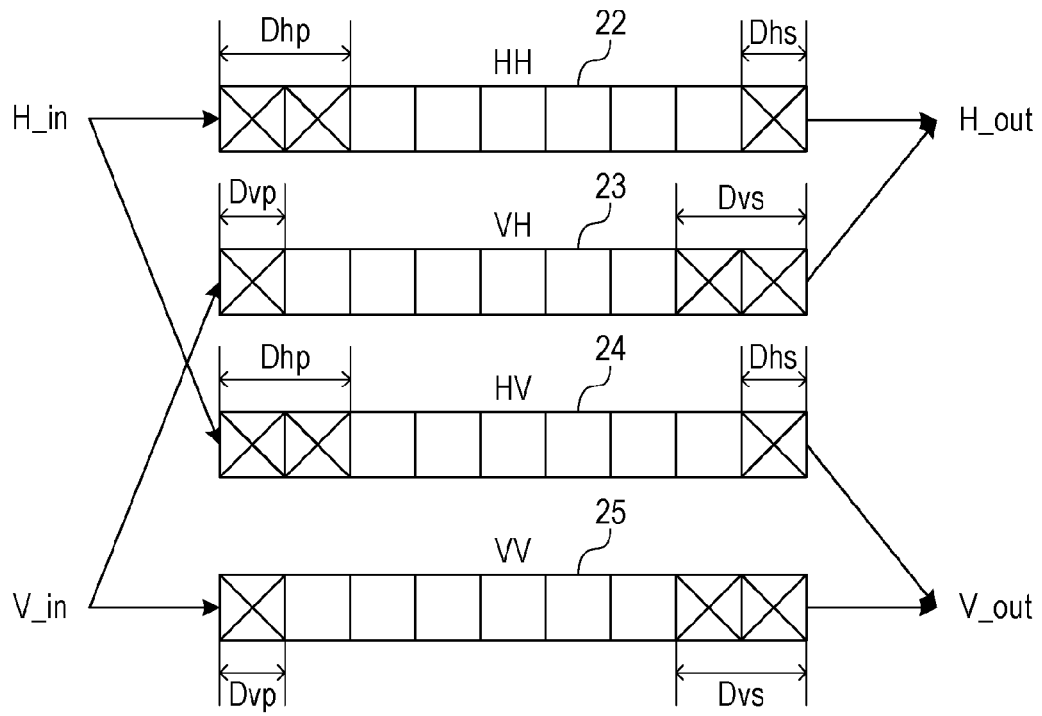
FIG. 30 is a diagram explaining how to set a tap of an FIR filter as unavailable.

FIG. 30 is a diagram explaining how to set a tap of an FIR filter as unavailable. As illustrated in FIG. 30, in each of the HH N-tap FIR filter 22 and the HV N-tap FIR filter 24, it is assumed that the number of taps on a leading side where the tap coefficients thereof are fixed to "0" is Dhp and the number of taps on a trailing side where the tap coefficients thereof are fixed to "0" is Dhs. In addition, in each of the VH N-tap FIR filter 23 and the VV N-tap FIR filter 25, it is assumed that the number of taps on a leading side where the tap coefficients thereof are fixed to "0" is Dvp and the number of taps on a trailing side where the tap coefficients thereof are fixed to "0" is Dvs. In FIG. 30, x symbols are assigned to taps whose tap coefficients are fixed to "0".

In a case of the plus delay difference or the delay difference of 0, Dhp may be a value obtained by rounding up, to the closest whole number, a value obtained by dividing the value of a current delay difference by 2, both Dhs and Dvp may be 0, and Dvs may be a value obtained by rounding down, to the closest whole number, a value obtained by dividing the value of the current delay difference by 2. Alternatively, Dhp may be a value obtained by rounding down, to the closest whole number, a value obtained by dividing the value of the current delay difference by 2, both Dhs and Dvp may be 0, and Dvs may be a value obtained by rounding up, to the closest whole number, a value obtained by dividing the value of the current delay difference by 2.

In a case of the minus delay difference, both Dhp and Dvs may be 0, Dhs may be a value obtained by rounding up, to the closest whole number, a value obtained by dividing and multiplying the value of the current delay difference by 2 and −1, respectively, and Dvp may be a value obtained by rounding down, to the closest whole number, a value obtained by dividing and multiplying the value of the current delay difference by 2 and −1, respectively. Alternatively, both Dhp and Dvs may be 0, Dhs may be a value obtained by rounding down, to the closest whole number, a value obtained by dividing and multiplying the value of the current delay difference by 2 and −1, respectively, and Dvp may be a value obtained by rounding up, to the closest whole number, a value obtained by dividing and multiplying the value of the current delay difference by 2 and −1, respectively.

When the equalization weight calculation unit 28 in the adaptive equalization unit 4 performs equalization weight calculation, a result of the equalization weight calculation may be set in a tap whose tap coefficient is fixed to "0", and the tap whose tap coefficient is fixed to "0" may be caused to remain "0" while no result of the equalization weight calculation is set therein.

Figure 31:
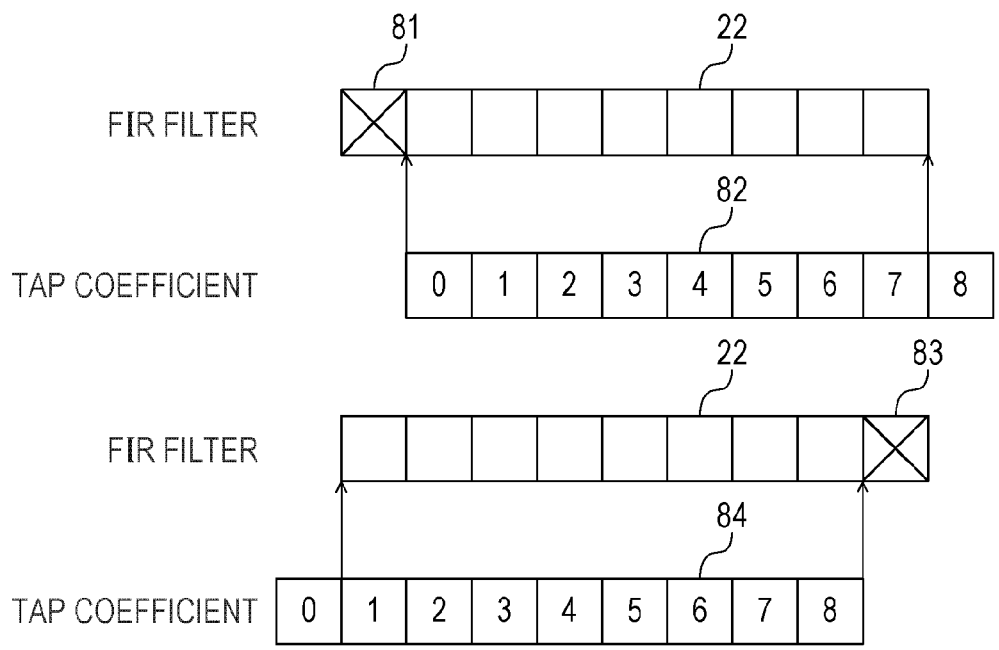
FIG. 31 is a diagram explaining how to set a tap coefficient in an available tap of an FIR filter.

FIG. 31 is a diagram explaining how to set a tap coefficient in an available tap of an FIR filter. In FIG. 31, x symbols are assigned to taps whose tap coefficients are fixed to "0". As illustrated in FIG. 31, in a case where the tap coefficient of a tap 81 located on the leading side of the HH N-tap FIR filter 22 is fixed to "0", tap coefficients 82 assigned by the channel estimation unit 5 (see FIG. 29) are set while being shifted to a side of a larger tap number by an amount corresponding to the tap 81 where the tap coefficient on the leading side is fixed to "0". Accordingly, a tap coefficient on the trailing side of the tap coefficients 82, in other words, the side of a larger tap number is discarded.

In addition, in a case where the tap coefficient of a tap 83 located on the trailing side of the HH N-tap FIR filter 22 is fixed to "0", tap coefficients 84 assigned by the channel estimation unit 5 (see FIG. 29) are set while being shifted to a side of a smaller tap number by an amount corresponding to the tap 83 where the tap coefficient on the trailing side is fixed to "0". Accordingly, a tap coefficient on the leading side of the tap coefficients 84, in other words, the side of a smaller tap number is discarded.

In FIG. 31, it is assumed that the numeric characters of "0" to "8" of the tap coefficients 82 and 84 indicate tap numbers normally set in the tap coefficients 82 and 84 assigned by the channel estimation unit 5 (see FIG. 29). In the example illustrated in, for example, FIG. 31, in a case where the tap coefficient of the leading tap 81 of the HH N-tap FIR filter 22 is fixed to "0", respective tap coefficients corresponding to the tap numbers of "012345678" are set while being shifted to a side of a larger tap number by an amount corresponding to the leading tap of the HH N-tap FIR filter 22. Therefore, a tap coefficient to be normally set in a tap of the tap number of 8 is discarded.

In addition, in the example illustrated in, for example, FIG. 31, in a case where the tap coefficient of the trailing tap 83 of the HH N-tap FIR filter 22 is fixed to "0", respective tap coefficients corresponding to the tap numbers of "012345678" are set while being shifted to a side of a smaller tap number by an amount corresponding to the trailing tap of the HH N-tap FIR filter 22. Therefore, a tap coefficient to be normally set in a tap of the tap number of 0 is discarded. The same applies to the VH N-tap FIR filter 23, the HV N-tap FIR filter 24, and the VV N-tap FIR filter 25.

[Example of Setting of Delay Difference of +1 in Third Example of Adaptive Equalizer]

FIG. 32 is a diagram illustrating examples of the settings of the delay difference of +1, Dhp round-up, and Dvs round-down in the adaptive equalizer illustrated in FIG. 29. In FIG. 32 to FIG. 42, x symbols are assigned to taps whose tap coefficients are fixed to 0. As illustrated in FIG. 32, in a case where the delay difference is +1, Dhp is rounded up, and Dvs is rounded down, the tap coefficient of the leading tap of each of the HH N-tap FIR filter 22 and the HV N-tap FIR filter 24 is fixed to 0. As for the VH N-tap FIR filter 23 and the VV N-tap FIR filter 25, there is no tap whose tap coefficient is fixed to 0. It is allowed not to change the channel estimation symbol position.

FIG. 33 is a diagram illustrating examples of settings of the delay difference of +1, Dhp round-down, and Dvs round-up in the adaptive equalizer illustrated in FIG. 29. As illustrated in FIG. 33, in a case where the delay difference is +1, Dhp is rounded down, and Dvs is rounded up, there is no tap whose tap coefficient is fixed to 0, in the HH N-tap FIR filter 22 and the HV N-tap FIR filter 24. The tap coefficient of the trailing tap of each of the VH N-tap FIR filter 23 and the VV N-tap FIR filter 25 is fixed to 0. It is allowed not to change the channel estimation symbol position.

[Example of Setting of Delay Difference of +2 in Third Example of Adaptive Equalizer]

Figure 34:
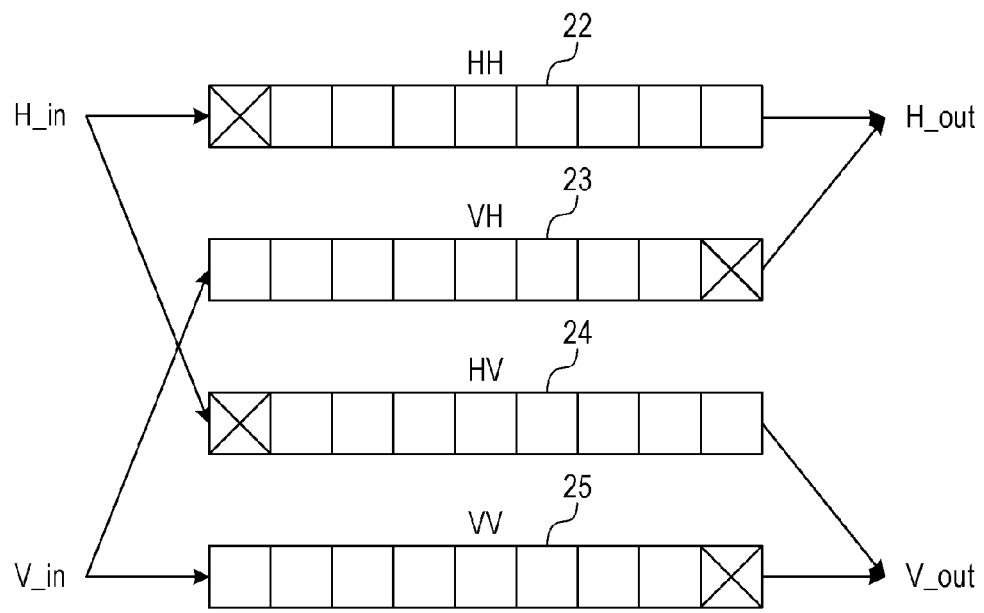
FIG. 34 is a diagram illustrating an example of a setting of a delay difference of +2 in the adaptive equalizer illustrated in FIG. 29.

FIG. 34 is a diagram illustrating an example of the setting of the delay difference of +2 in the adaptive equalizer illustrated in FIG. 29. As illustrated in FIG. 34, in a case where the delay difference is +2, the tap coefficient of the leading tap of each of the HH N-tap FIR filter 22 and the HV N-tap FIR filter 24 is fixed to 0. The tap coefficient of the trailing tap of each of the VH N-tap FIR filter 23 and the VV N-tap FIR filter 25 is fixed to 0. It is allowed not to change the channel estimation symbol position.

[Example of Setting of Delay Difference of +3 in Third Example of Adaptive Equalizer]

Figure 35:
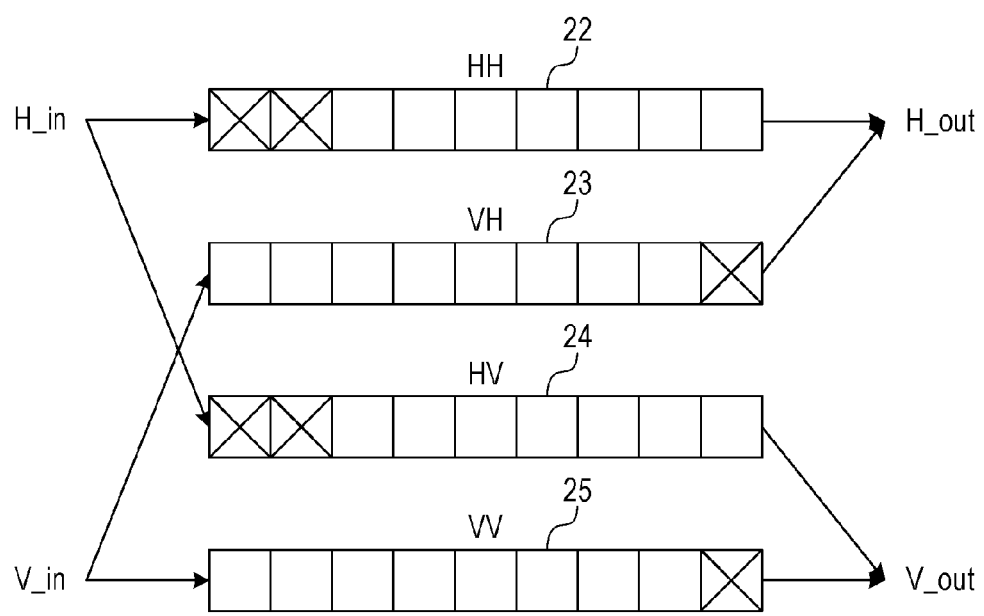
FIG. 35 is a diagram illustrating examples of settings of a delay difference of +3, Dhp round-up, and Dvs round-down in the adaptive equalizer illustrated in FIG. 29.

FIG. 35 is a diagram illustrating examples of settings of the delay difference of +3, Dhp round-up, and Dvs round-down in the adaptive equalizer illustrated in FIG. 29. As illustrated in FIG. 35, in a case where the delay difference is +3, Dhp is rounded up, and Dvs is rounded down, the tap coefficients of the taps of two stages located on the leading side of each of the HH N-tap FIR filter 22 and the HV N-tap FIR filter 24 are fixed to 0. The tap coefficient of the trailing tap of each of the VH N-tap FIR filter 23 and the VV N-tap FIR filter 25 is fixed to 0. It is allowed not to change the channel estimation symbol position.

Figure 36:
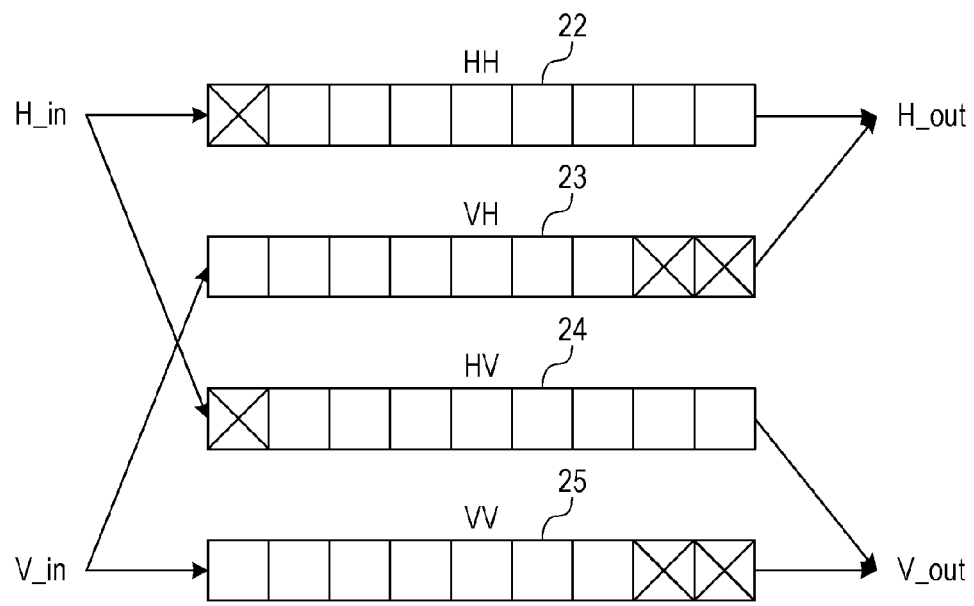
FIG. 36 is a diagram illustrating examples of settings of the delay difference of +3, Dhp round-down, and Dvs round-up in the adaptive equalizer illustrated in FIG. 29.

FIG. 36 is a diagram illustrating examples of settings of the delay difference of +3, Dhp round-down, and Dvs round-up in the adaptive equalizer illustrated in FIG. 29. As illustrated in FIG. 36, in a case where the delay difference is +3, Dhp is rounded down, and Dvs is rounded up, the tap coefficient of the leading tap of each of the HH N-tap FIR filter 22 and the HV N-tap FIR filter 24 is fixed to 0. The tap coefficients of the taps of two stages located on the trailing side of each of the VH N-tap FIR filter 23 and the VV N-tap FIR filter 25 are fixed to 0. It is allowed not to change the channel estimation symbol position.

[Example of Setting of Delay Difference of +4 in Third Example of Adaptive Equalizer]

Figure 37:
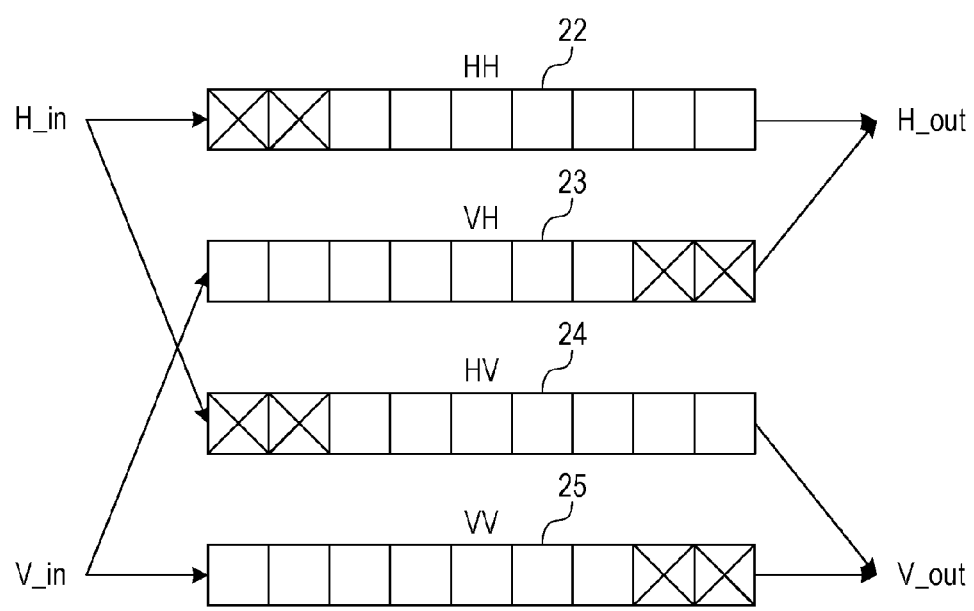
FIG. 37 is a diagram illustrating an example of a setting of a delay difference of +4 in the adaptive equalizer illustrated in FIG. 29.

FIG. 37 is a diagram illustrating an example of a setting of the delay difference of +4 in the adaptive equalizer illustrated in FIG. 29. As illustrated in FIG. 37, in a case where the delay difference is +4, the tap coefficients of the taps of two stages located on the leading side of each of the HH N-tap FIR filter 22 and the HV N-tap FIR filter 24 are fixed to 0. The tap coefficients of the taps of two trailing stages of each of the VH N-tap FIR filter 23 and the VV N-tap FIR filter 25 is fixed to 0. It is allowed not to change the channel estimation symbol position.

[Example of Setting of Delay Difference of −1 in Third Example of Adaptive Equalizer]

Figure 38:
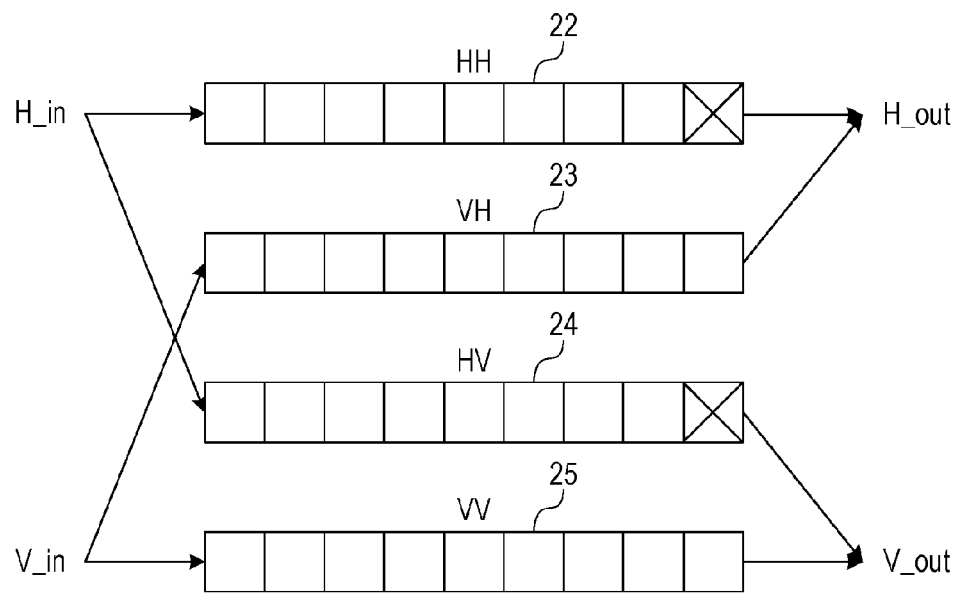
FIG. 38 is a diagram illustrating examples of settings of a delay difference of −1, Dhs round-up, and Dvp round-down in the adaptive equalizer illustrated in FIG. 29.

FIG. 38 is a diagram illustrating examples of settings of the delay difference of −1, Dhs round-up, and Dvp round-down in the adaptive equalizer illustrated in FIG. 29. As illustrated in FIG. 38, in a case where the delay difference is −1, Dhs is rounded up, and Dvp is rounded down, the tap coefficient of the trailing tap of each of the HH N-tap FIR filter 22 and the HV N-tap FIR filter 24 is fixed to 0. As for the VH N-tap FIR filter 23 and the VV N-tap FIR filter 25, there is no tap whose tap coefficient is fixed to 0. It is allowed not to change the channel estimation symbol position.

Figure 39:
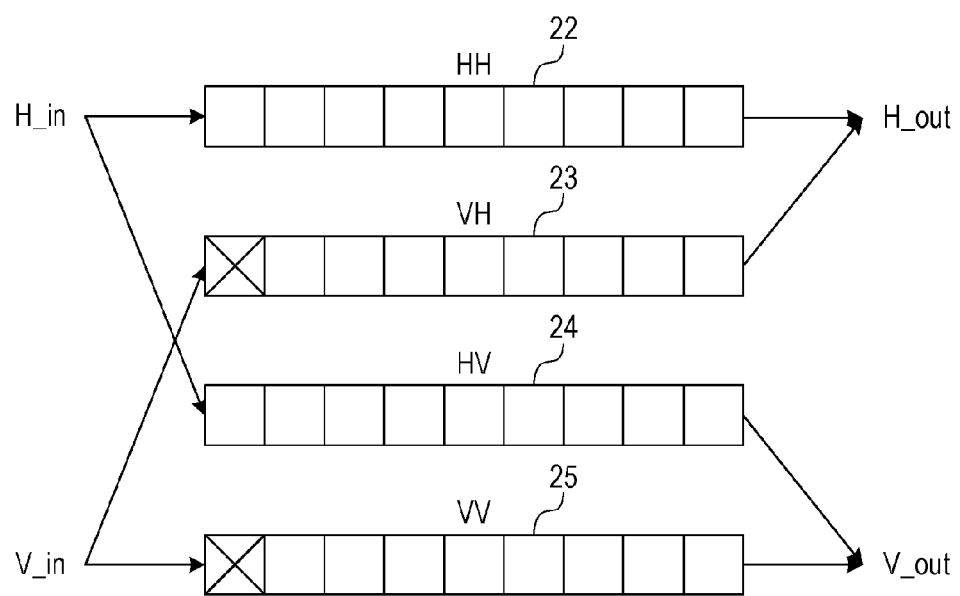
FIG. 39 is a diagram illustrating examples of settings of the delay difference of −1, Dhs round-down, and Dvp round-up in the adaptive equalizer illustrated in FIG. 29.

FIG. 39 is a diagram illustrating examples of settings of the delay difference of −1, Dhs round-down, and Dvp round-up in the adaptive equalizer illustrated in FIG. 29. As illustrated in FIG. 39, in a case where the delay difference is −1, Dhs is rounded down, and Dvp is rounded up, there is no tap whose tap coefficient is fixed to 0, in the HH N-tap FIR filter 22 and the HV N-tap FIR filter 24. The tap coefficient of the leading tap of each of the VH N-tap FIR filter 23 and the VV N-tap FIR filter 25 is fixed to 0. It is allowed not to change the channel estimation symbol position.

[Example of Setting of Delay Difference of −2 in Third Example of Adaptive Equalizer]

Figure 40:
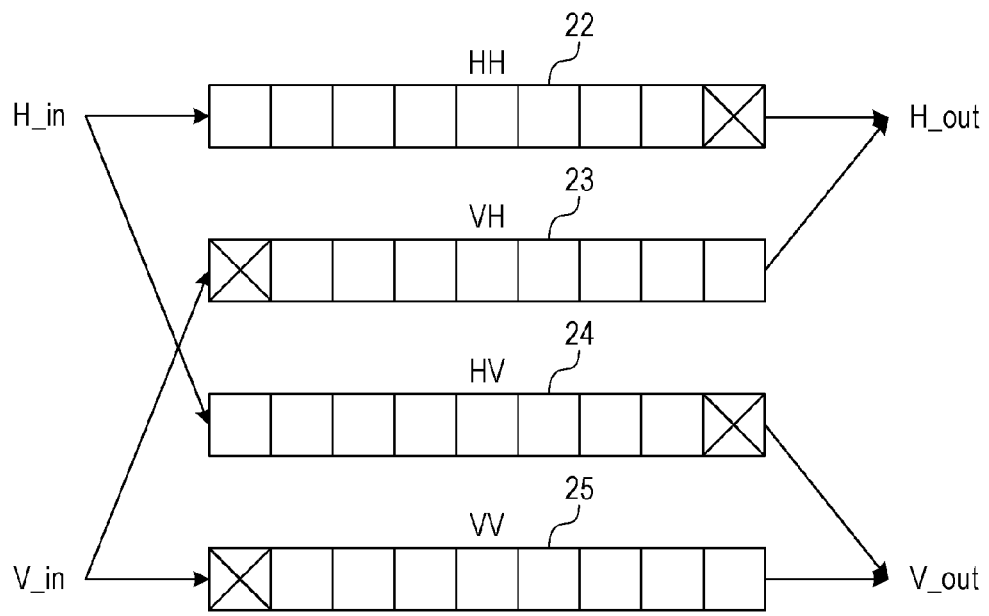
FIG. 40 is a diagram illustrating an example of a setting of a delay difference of −2 in the adaptive equalizer illustrated in FIG. 29.

FIG. 40 is a diagram illustrating an example of a setting of the delay difference of −2 in the adaptive equalizer illustrated in FIG. 29. As illustrated in FIG. 40, in a case where the delay difference is −2, the tap coefficient of the trailing tap of each of the HH N-tap FIR filter 22 and the HV N-tap FIR filter 24 is fixed to 0. The tap coefficient of the leading tap of each of the VH N-tap FIR filter 23 and the VV N-tap FIR filter 25 is fixed to 0. It is allowed not to change the channel estimation symbol position.

[Example of Setting of Delay Difference of −3 in Third Example of Adaptive Equalizer]

Figure 41:
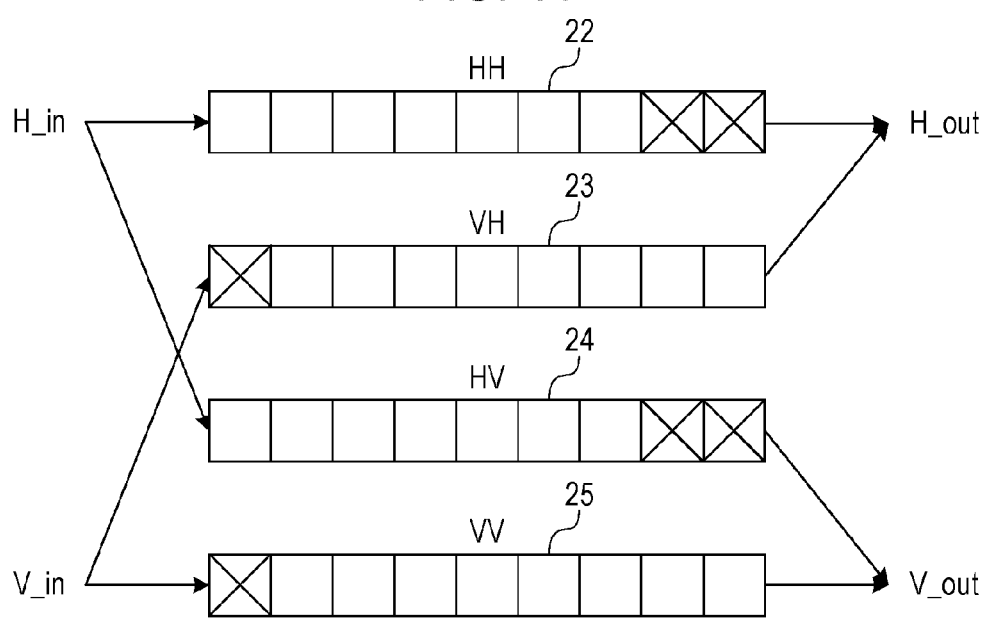
FIG. 41 is a diagram illustrating examples of settings of a delay difference of −3, Dhs round-up, and Dvp round-down in the adaptive equalizer illustrated in FIG. 29.

FIG. 41 is a diagram illustrating examples of settings of the delay difference of −3, Dhs round-up, and Dvp round-down in the adaptive equalizer illustrated in FIG. 29. As illustrated in FIG. 41, in a case where the delay difference is −3, Dhs is rounded up, and Dvp is rounded down, the tap coefficients of the taps of two stages located on the trailing side of each of the HH N-tap FIR filter 22 and the HV N-tap FIR filter 24 are fixed to 0. The tap coefficient of the leading tap of each of the VH N-tap FIR filter 23 and the VV N-tap FIR filter 25 is fixed to 0. It is allowed not to change the channel estimation symbol position.

Figure 42:
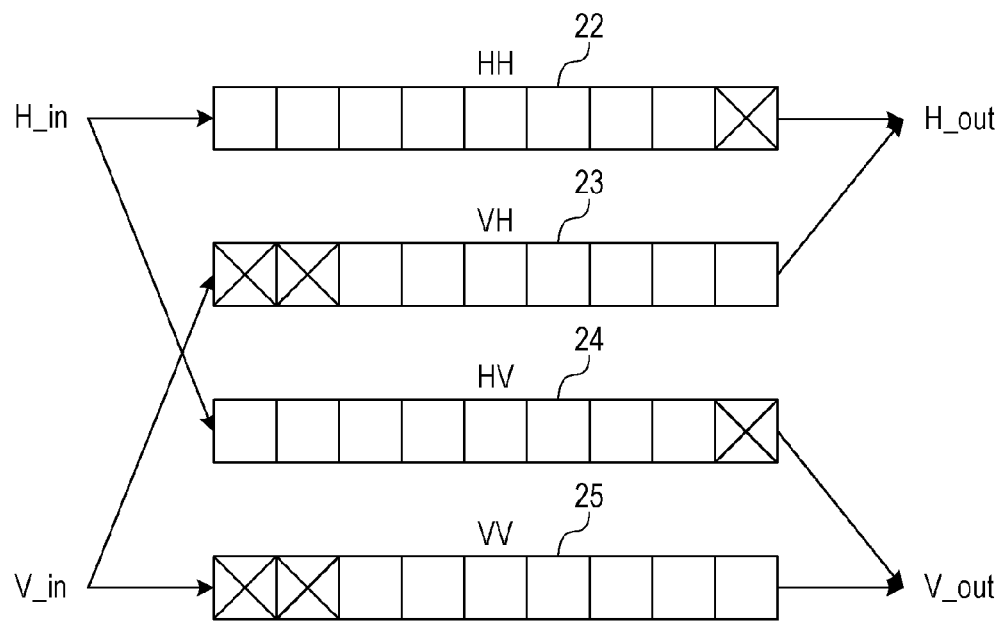
FIG. 42 is a diagram illustrating examples of settings of the delay difference of −3, Dhs round-down, and Dvp round-up in the adaptive equalizer illustrated in FIG. 29.

FIG. 42 is a diagram illustrating examples of settings of the delay difference of −3, Dhs round-down, and Dvp round-up in the adaptive equalizer illustrated in FIG. 29. As illustrated in FIG. 42, in a case where the delay difference is −3, Dhs is rounded down, and Dvp is rounded up, the tap coefficient of the trailing tap of each of the HH N-tap FIR filter 22 and the HV N-tap FIR filter 24 is fixed to 0. The tap coefficients of the taps of two stages located on the leading side of each of the VH N-tap FIR filter 23 and the VV N-tap FIR filter 25 are fixed to 0. It is allowed not to change the channel estimation symbol position. Since other configurations and the contents of other processing operations are the same as those in the above-mentioned first example of the adaptive equalizer, the redundant descriptions thereof will be omitted.

According to the optical receiving device including the adaptive equalizer 120 illustrated in FIG. 29, in the same way as the optical receiving device including the adaptive equalizer 120 illustrated in FIG. 2, it becomes possible to obtain the parameters of the adaptive equalizer, which are capable of adapting to a disturbance at the time of communication. Therefore, it is possible to further improve the reception performance. In addition, according to the optical receiving device including the adaptive equalizer 120 illustrated in FIG. 29, an advantageous effect that it is allowed not to change hardware or an advantageous effect that the size of hardware does not become larger is achieved.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An optical receiving device, comprising:
an adaptive equalizer that comprises:
a position estimation unit configured to estimate, based on a first signal component and a second signal component of a reception signal generated by reception of a training sequence pattern transmitted from an optical transmitter, a symbol position of the reception signal, and generates an estimated symbol position,
a delay unit configured to provide a delay difference between the first signal component and the second signal component,
a control unit configured to set a plurality of symbol displacement amount candidates of displacement amounts for the estimated symbol position, causes the delay unit to generate a plurality of delay differences, and generates a channel estimation symbol position used for channel estimation,
a channel estimation unit configured to perform, based on the channel estimation symbol position, channel estimation on a transmission path with the optical transmitter, using the first signal component and the second signal component between which the delay difference is provided by the delay unit, and generates parameters for realizing a characteristic opposite to a transmission path characteristic obtained by the channel estimation, an adaptive equalization unit in which the parameters generated by the channel estimation unit are set and that performs adaptive equalization on the first signal component and the second signal component between which the delay difference is provided by the delay unit, and restores a signal, and an error rate calculation unit configured to calculate an error rate of the signal restored by the adaptive equalization unit, wherein the control unit acquires, from the error rate calculation unit, an error rate for each of the plural delay differences with respect to each of the plural symbol displacement amount candidates, and obtains a final channel estimation symbol position so that the acquired error rate is less than or equal to a reference value and the delay difference provided between the first signal component and the second signal component by the delay unit becomes a maximum available value, and the channel estimation unit generates, based on the final channel estimation symbol position, parameters to be set in the adaptive equalization unit in a case where the delay difference provided by the delay unit is zero.

2. The optical receiving device according to claim 1, wherein the delay unit includes a first buffer that delays the first signal component, and a second buffer that delays the second signal component, and the control unit sets the number of buffer stages of one of the first buffer and the second buffer to zero stages, sets the number of buffer stages of the other to zero or more stages, in accordance with a current delay difference, and obtains the channel estimation symbol position by adding, to the estimated symbol position, a value of a current symbol displacement amount candidate and a value obtained by rounding up or rounding down, to a closest whole number, an absolute value of a value obtained by dividing the current delay difference by two.

3. The optical receiving device according to claim 1, wherein the delay unit includes a first FIR filter that compensates a characteristic of the first signal component, and a second FIR filter that compensates a characteristic of the second signal component, and the optical receiving device further includes a tap coefficient control unit that provides a delay difference between the first signal component that passes through the first FIR filter and the second signal component that passes through the second FIR filter, by shifting tap coefficients of the first FIR filter or tap coefficients of the second FIR filter in accordance with a current delay difference.

4. An optical receiving device comprising:

an adaptive equalizer that comprises:

a position estimation unit configured to estimate, based on a first signal component and a second signal component of a reception signal generated by reception of a training sequence pattern transmitted from an optical transmitter, a symbol position of the reception signal, and generates an estimated symbol position, a control unit configured to set a plurality of symbol displacement amount candidates of displacement amounts for the estimated symbol position, and generates a channel estimation symbol position used for channel estimation, a channel estimation unit configured to perform, based on the channel estimation symbol position, channel estimation on a transmission path with the optical transmitter, using the first signal component and the second signal component, and generates parameters for realizing a characteristic opposite to a transmission path characteristic obtained by the channel estimation, an adaptive equalization unit in which the parameters generated by the channel estimation unit are set and that performs adaptive equalization on the first signal component and the second signal component, and restores a signal, and an error rate calculation unit configured to calculate an error rate of the signal restored by the adaptive equalization unit, wherein the control unit provides a plurality of delay differences between the first signal component and the second signal component with respect to each of the plural symbol displacement amount candidates, by controlling availability or unavailability of taps in which the parameters of the adaptive equalization unit are set, acquires, from the error rate calculation unit, an error rate for each of the plural delay differences, and obtains a final channel estimation symbol position so that the acquired error rate is less than or equal to a reference value and the delay difference becomes a maximum available value, and the channel estimation unit generates, based on the final channel estimation symbol position, parameters to be set in the adaptive equalization unit in a case where all the taps are available.

5. The optical receiving device according to claim 4, wherein in accordance with a current delay difference, the control unit sets, to zero, tap coefficients on a leading side for one of a first FIR filter used for the first signal component and a second FIR filter used for the second signal component, included in the adaptive equalization unit, the number of the tap coefficients on the leading side corresponding to a value obtained by rounding up, to a closest whole number, an absolute value of a value obtained by dividing the current delay difference by two, and sets, to zero, tap coefficients on a trailing side for the other, the number of the tap coefficients on the trailing side corresponding to a value obtained by rounding down, to a closest whole number, an absolute value of a value obtained by dividing the current delay difference by two, or alternatively, the control unit sets, to zero, tap coefficients on a leading side for one of the first FIR filter used for the first signal component and the second FIR filter used for the second signal component, the number of the tap coefficients on the leading side corresponding to a value obtained by rounding down, to a closest whole number, an absolute value of a value obtained by dividing the current delay difference by two, and sets, to zero, tap coefficients on a trailing side for the other, the number of the tap coefficients on the trailing side corresponding to a value obtained by rounding up, to a closest whole number, an absolute value of a value obtained by dividing the current delay difference by two.

6. The optical receiving device according to claim 1, wherein under the condition that the error rate is less than or equal to the reference value with respect to each of the plural symbol displacement amount candidates, the control unit defines, as a maximum compensatable delay difference, a smaller one of a maximum delay difference in a case where the first signal component is later than the second signal component and a maximum delay difference in a case where the second signal component is later than the first signal component, and defines, as a symbol displacement amount for the estimated symbol position, a symbol displacement amount candidate where the maximum compensatable delay difference becomes a maximum.

7. The optical receiving device according to claim 1, wherein
the control unit sets, as the delay difference, integer numbers ranging from a value obtained by dividing and multiplying the number of tap stages of an FIR filter included in the adaptive equalization unit by two and minus one, respectively, to a value obtained by dividing the number of tap stages by two.

8. The optical receiving device according to claim 1, further comprising:
   a polarized wave separation unit configured to separate a received optical signal into a first polarized wave component and a second polarized wave component;
   a digital conversion unit configured to convert the first polarized wave component and the second polarized wave component into digital signals; and
   a digital signal processing unit configured to perform signal processing on the digital signals, wherein
   the digital signal processing unit generates the first signal component and the second signal component from the first polarized wave component and the second polarized wave component, respectively, converted into the digital signals, and the first signal component and the second signal component are equalized by the adaptive equalizer.

* * * * *